US012785233B2

(12) United States Patent
Murata et al.

(10) Patent No.: US 12,785,233 B2
(45) Date of Patent: Nov. 3, 2026

(54) METHOD FOR MANUFACTURING POWER STORAGE MODULE

(71) Applicant: KABUSHIKI KAISHA TOYOTA JIDOSHOKKI, Kariya (JP)

(72) Inventors: Takuya Murata, Kariya (JP); Shinya Asai, Kariya (JP); Ryota Isomura, Kariya (JP); Takashi Fukuda, Kariya (JP); Nobukiyo Ito, Kariya (JP); Yushi Kondo, Kariya (JP); Yusuke Yamashita, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 433 days.

(21) Appl. No.: 18/685,095

(22) PCT Filed: Aug. 2, 2022

(86) PCT No.: PCT/JP2022/029642
§ 371 (c)(1),
(2) Date: Feb. 20, 2024

(87) PCT Pub. No.: WO2023/026793
PCT Pub. Date: Mar. 2, 2023

(65) Prior Publication Data
US 2025/0132475 A1 Apr. 24, 2025

(30) Foreign Application Priority Data
Aug. 23, 2021 (JP) ................................ 2021-135744

(51) Int. Cl.
*H01M 50/636* (2021.01)
*H01M 10/04* (2006.01)

(52) U.S. Cl.
CPC ..... *H01M 50/636* (2021.01); *H01M 10/0468* (2013.01)

(58) Field of Classification Search
CPC ............ H01M 10/04; H01M 10/0468; H01M 10/0585; H01M 50/60; H01M 50/609; H01M 50/627; H01M 50/636
See application file for complete search history.

(56) References Cited

U.S. PATENT DOCUMENTS

2015/0207125 A1* 7/2015 Kishimoto .......... H01M 50/538
429/129

FOREIGN PATENT DOCUMENTS

DE 102013208772 A1 * 11/2013 ........ H01M 10/0431
JP 2012-234823 A 11/2012
(Continued)

OTHER PUBLICATIONS

JP 2018-156834 A English Translaiton by FIT database.*
(Continued)

*Primary Examiner* — Golam Mowla
(74) *Attorney, Agent, or Firm* — Sughrue Mion, PLLC

(57) ABSTRACT

A method for manufacturing a power storage module includes: a placing step of placing an electrode laminate on a restraint member so that a laminating direction runs along a vertical direction; a connecting step of connecting a first connection part so that a connecting portion of a second connection part with respect to a connected part is positioned on an upper side in the vertical direction than an opening; a supplying step of connecting a distal end part of a supply pipe for an electrolytic solution to the second connection part, and supplying the electrolytic solution to a space; and a conveying step of removing a recessed part of the supply pipe from the second connection part, and conveying a cell stack placed on the restraint member in a state in which the opening is connected to the first connection part.

15 Claims, 24 Drawing Sheets

(56) References Cited

FOREIGN PATENT DOCUMENTS

| | | | | | |
|---|---|---|---|---|---|
| JP | 2018156834 A | * | 10/2018 | .............. | Y02P 70/50 |
| JP | 2019139994 A | * | 8/2019 | .............. | Y02P 70/50 |
| WO | WO-2015068421 A1 | * | 5/2015 | .......... | H01M 50/209 |

OTHER PUBLICATIONS

JP 2019-139994 A English Translaiton by FIT database.*
International Preliminary Report on Patentability (with translation of Written Opinion) issued Mar. 7, 2024 in Application No. PCT/JP2022/029642.
International Search Report of PCT/JP2022/029642 dated Oct. 25, 2022 [PCT/ISA/210].

* cited by examiner (A)

(B)

(A)

(B)

(A)

(B)

METHOD FOR MANUFACTURING POWER STORAGE MODULE

CROSS REFERENCE TO RELATED APPLICATIONS

This application is a National Stage of International Application No. PCT/JP2022/029642 filed on Aug. 2, 2022, claiming priority based on Japanese Patent Application No. 2021-135744 filed on Aug. 23, 2021.

TECHNICAL FIELD

An aspect of the present invention relates to a method for manufacturing a power storage module.

BACKGROUND ART

There is known a power storage module including: a laminate including a plurality of electrodes laminated in a first direction, a sealing part (sealing material) sealing each space between adjacent electrodes, and an opening formed on the sealing part to connect the inside and the outside of the space and opening in a second direction intersecting with the first direction; and an electrolytic solution housed in each space (for example, Patent Document 1). A step of manufacturing such a power storage module includes, for example, a laminating step of forming a laminate in which electrodes are laminated, a supplying step of supplying an electrolytic solution to a space between the electrodes via an opening, an activating step of activating the laminate to which the electrolytic solution is supplied, a sealing step of sealing the opening and forming the power storage module, and the like.

CITATION LIST

Patent Literature

[Patent Document 1] Japanese Unexamined Patent Publication No. 2012-234823

SUMMARY OF INVENTION

Technical Problem

At the step of manufacturing the power storage module described above, it is preferable to convey the laminate or perform processing on the laminate in a state in which the electrodes are laminated in a vertical direction in terms of easy handling and the like. However, at a series of steps for manufacturing the power storage module from when the electrolytic solution is injected into the space between the electrodes of the laminate until the opening of the laminate is sealed, if the laminate is caused to be in a state in which the electrodes are laminated in the vertical direction, the opening is opened in a direction along a horizontal direction. Thus, to convey the laminate or perform processing on the laminate in a state in which the electrodes are laminated in the vertical direction, it is necessary to take a measure to prevent the electrolytic solution from leaking out from the opening.

Thus, an object of an aspect of the present invention is to provide a method for manufacturing a power storage module with which an electrolytic solution can be prevented from leaking out from an opening of a laminate even when the electrolytic solution is supplied to the laminate or the laminate is conveyed to the next step following a supplying step while the laminate is maintained in a state in which the electrodes are laminated in the vertical direction.

Solution to Problem

A method for manufacturing a power storage module according to an aspect of the present invention is a method for manufacturing a power storage module that includes configured to include a plurality of electrodes laminated in a first direction, a sealing part configured to seal a space between the electrodes adjacent to each other, and an opening formed on the sealing part to connect an inside and an outside of the space and opening in a second direction intersecting with the first direction; and an that includes electrolytic solution accommodated in the space, the method includes: a placing step of placing the laminate on a conveyance palette so that the first direction runs along a vertical direction; a connecting step of preparing a flow channel unit including a first connection part capable of being liquid-tightly connected to the opening, a second connection part capable of being connected to a connected part, and a flow channel causing the first connection part to communicate with the second connection part, and the connecting step connecting the first connection part of the flow channel unit to the opening of the laminate placed at the placing step so that a connecting portion of the second connection part with respect to the connected part is positioned above the opening in the vertical direction; a supplying step of connecting the connected part of a supply pipe for the electrolytic solution to the second connection part of the flow channel unit after the connecting step, and supplying the electrolytic solution to the space via the flow channel unit; and a conveying step of removing the connected part of the supply pipe from the second connection part after the supplying step, and conveying the laminate placed on the conveyance palette to a place where a next step is performed so that the first direction runs along the vertical direction in a state in which the opening is connected to the first connection part.

In this method, the opening of the laminate, which is placed on the conveyance palette so that the first direction runs along the vertical direction, opens in a direction along the horizontal direction. In the laminate to which the electrolytic solution is supplied through the opening opened in the direction along the horizontal direction as described above, the possibility that the electrolytic solution leaks out from the opening becomes high. However, the method according to an aspect of the present invention can prevent the electrolytic solution from leaking out from the laminate during conveyance because the laminate is conveyed to a place where the next step is performed without removing the flow channel unit including the second connection part in which the connecting portion with respect to the connected part is positioned on the upper side in the vertical direction than the opening even after the supplying step. As a result, the electrolytic solution can be prevented from leaking out from the opening of the laminate even when the electrolytic solution is supplied to the laminate or the laminate is conveyed to the next step following the supplying step while the laminate is maintained in a state in which the electrodes are laminated in the vertical direction.

In the method for manufacturing the power storage module according to an aspect of the present invention, the first connection part may be connected to the opening in a state of being biased with respect to the laminate. In this method, the flow channel unit can be more liquid-tightly connected to the opening of a cell stack.

The method for manufacturing the power storage module according to an aspect of the present invention may further include a restraining step of attaching, to the laminate, a restraint member configured to restrain the laminate in the first direction with a predetermined pressure before the supplying step. This method can prevent a situation in which the vicinity of the opening swells at the time of supplying the electrolytic solution and the electrolytic solution is not supplied to the inside of the space.

In the method for manufacturing the power storage module according to an aspect of the present invention the restraint member may be attached to the laminate so that one side surface of the restraint member is flush with a side surface of the laminate on which the opening is formed at the restraining step. With this method, a member or a device such as the flow channel unit connected to the opening, for example, can be prevented from interfering with the restraint member, and workability at the time of attaching a member or a device to the opening can be improved.

In the method for manufacturing the power storage module according to an aspect of the present invention, the flow channel unit and the restraint member are configured to be able to be attached or detached to/from each other, and the first connection part may be connected to the opening of the laminate by attaching the flow channel unit to the restraint member at the connecting step. In this method, the first connection part is connected to the opening by performing simple work of attaching the flow channel unit to the restraint member, so that workability at the time of attaching the flow channel unit to the opening can be improved.

The method for manufacturing the power storage module according to an aspect of the present invention, the second connection part may be closed when the connected part is removed from the second connection part at the conveying step. With this method, the electrolytic solution in the space can be securely prevented from leaking out from the second connection part.

The method for manufacturing the power storage module according to an aspect of the present invention further includes an activating step as the next step of accommodating the laminate in a charging and discharging device to activate the laminate at the place to where the laminate is conveyed at the conveying step, the flow channel unit being connected to the laminate. Gas generated in the space due to the activation at the activating step may be discharged via the second connection part. In this method, the laminate can be easily connected to an exhaust facility, so that workability at the activating step can be improved.

At the activating step of the method for manufacturing the power storage module according to an aspect of the present invention, a connected part of a gas bag may be connected to the second connection part. In this method, gas exhausted at the activating step can be recovered by simple preparing work without connection to a large-scale facility.

The method for manufacturing the power storage module according to an aspect of the present invention may further include, a sealing step of changing a posture of the laminate after the activating step so that the opening of the laminate is oriented in a vertically upward direction, then removing the flow channel unit from the opening, and sealing the opening. In this method, the posture can be changed so that the opening is oriented upward when the opening is sealed, so that the electrolytic solution can be prevented from leaking out from the opening at the time of removing the flow channel unit.

Advantageous Effects of Invention

According to an aspect of the present invention, the electrolytic solution can be prevented from leaking out from the opening of the laminate even when the electrolytic solution is supplied to the laminate or the laminate is conveyed to the next step following the supplying step while the laminate is maintained in a state in which the electrodes are laminated in the vertical direction.

DESCRIPTION OF EMBODIMENTS

Figure 1:
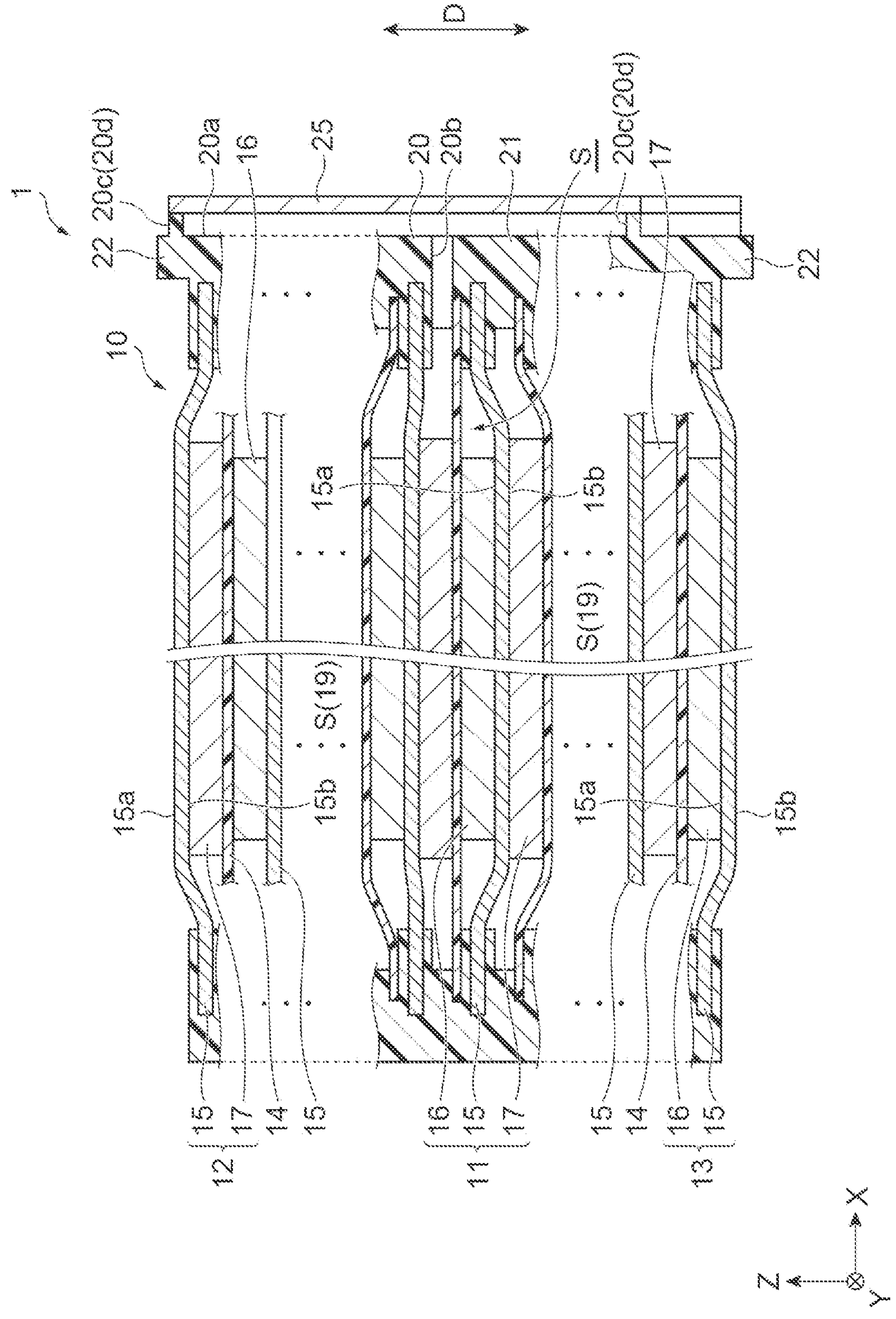
FIG. 1 is a schematic cross-sectional view illustrating a power storage module according to an embodiment.

The following describes an embodiment of the present disclosure in detail with reference to the attached drawings. In the description of the drawings, the same or an equivalent element is denoted by the same reference numeral, and redundant description is omitted.

A power storage module 1 illustrated in FIG. 1 is an example of a power storage module manufactured by a method for manufacturing the power storage module according to the present embodiment. The power storage module 1 is, for example, used as a battery for various vehicles such as a forklift, a hybrid vehicle, and an electric vehicle. The power storage module 1 is, for example, a secondary battery such as a lithium ion secondary battery or a nickel hydrogen secondary battery. The power storage module 1 may also be an electric double layer capacitor. The present embodiment exemplifies a case in which the power storage module 1 is a lithium ion secondary battery. The power storage module 1 according to the present embodiment is, for example, a large flat battery in which a width of one side along the X-axis direction and the Y-axis direction is equal to or larger than 1000 mm and a thickness along the Z-axis direction is equal to or smaller than 100 mm.

The power storage module 1 includes an electrode laminate 10, a sealing part 20, and an electrolytic solution 19. The electrode laminate 10 includes a plurality of bipolar electrodes (electrodes) 11, an anode terminal electrode (electrode) 12, a cathode terminal electrode (electrode) 13, and a plurality of separators 14.

Each of the bipolar electrodes 11 includes a current collector 15, a cathode active material layer 16, and an anode active material layer 17. The current collector 15 is formed to have a sheet shape, for example. The current collector 15 is formed to have a rectangular shape, for example, when viewed from the Z-axis direction. The cathode active material layer 16 is disposed on a first surface 15*a* of the current collector 15. The cathode active material layer 16 is formed to have a rectangular shape, for example, when viewed from the Z-axis direction. The anode active material layer 17 is disposed on a second surface 15*b* of the current collector 15. The anode active material layer 17 is formed to have a rectangular shape, for example, when viewed from the Z-axis direction. The first surface 15*a* of the current collector 15 is a surface facing one side of the Z-axis direction, and faces a positive side of the Z-axis direction in the example of FIG. 1. The second surface 15*b* of the current collector 15 is a surface facing the other side of the Z-axis direction, and faces a negative side of the Z-axis direction in the example of FIG. 1.

The anode active material layer 17 is a size larger than the cathode active material layer 16 when viewed from the Z-axis direction. That is, in plan view viewed from the Z-axis direction, the entire formation region of the cathode active material layer 16 is positioned within a formation region of the anode active material layer 17. The bipolar electrodes 11 are laminated along the Z-axis direction so that the cathode active material layer 16 and the anode active material layer 17 are opposed to each other. That is, the bipolar electrodes 11 are laminated in a laminating direction D along the Z-axis direction.

The anode terminal electrode 12 includes the current collector 15 and the anode active material layer 17. The anode terminal electrode 12 does not include the cathode active material layer 16. That is, an active material layer is not disposed on the first surface 15*a* of the current collector 15 of the anode terminal electrode 12. The first surface 15*a* of the current collector 15 of the anode terminal electrode 12 is exposed. The anode terminal electrode 12 is disposed at a first end in the Z-axis direction of the electrode laminate 10. The anode active material layer 17 of the anode terminal electrode 12 is opposed to the cathode active material layer 16 of the bipolar electrode 11 positioned to be closer to the first end in the Z-axis direction of the electrode laminate 10. The first end in the Z-axis direction of the electrode laminate 10 is an end part on the positive side of the Z-axis direction in the example of FIG. 1.

The cathode terminal electrode 13 includes the current collector 15 and the cathode active material layer 16. The cathode terminal electrode 13 does not include the anode active material layer 17. That is, an active material layer is not disposed on the second surface 15*b* of the current collector 15 of the cathode terminal electrode 13. The second surface 15*b* of the current collector 15 of the cathode terminal electrode 13 is exposed. The cathode terminal electrode 13 is disposed at a second end in the Z-axis direction of the electrode laminate 10. The cathode active material layer 16 of the cathode terminal electrode 13 is opposed to the anode active material layer 17 of the bipolar electrode 11 positioned to be closer to the second end in the Z-axis direction of the electrode laminate 10. The second end in the Z-axis direction of the electrode laminate 10 is an end part on the negative side of the Z-axis direction in the example of FIG. 1.

The separator 14 is disposed between the bipolar electrodes 11 and 11 adjacent to each other, between the anode terminal electrode 12 and the bipolar electrode 11, and between the cathode terminal electrode 13 and the bipolar electrode 11. The separator 14 is interposed between the cathode active material layer 16 and the anode active material layer 17. The separator 14 isolates the cathode active material layer 16 from the anode active material layer 17 to cause a charge carrier such as a lithium ion to pass therethrough while preventing a short circuit from being caused by contact between adjacent electrodes.

The current collector 15 is a chemically inactive electric conductor for causing an electric current to continuously flow in the cathode active material layer 16 and the anode active material layer 17 during discharge or charge of the lithium ion secondary battery. A material of the current collector 15 is, for example, a metallic material, a conductive resin material, a conductive inorganic material, or the like. Examples of the conductive resin material include resin obtained by adding a conductive filler to a conductive polymeric material or a non-conductive polymeric material as needed, for example. The current collector 15 may include a plurality of layers. In this case, each of the layers of the current collector 15 may include the metallic material or the conductive resin material described above.

A coating layer may be formed on a surface of the current collector 15. The coating layer may be formed by a well-known method such as plating processing or spray coating, for example. The current collector 15 may be formed to have a plate shape, a foil shape (for example, metal foil), a film shape, a mesh shape, or the like, for example. Examples of the metal foil include aluminum foil, copper foil, nickel foil, titanium foil, stainless steel foil, or the like. Examples of the stainless steel foil include SUS304, SUS316, SUS301, or the like specified in JIS G 4305:2015, for example. The current collector 15 may be alloy foil of the metals described above, or foil obtained by integrating pieces of foil of the metals described above. In a case in which the current collector 15 is formed to have a foil shape, the thickness of the current collector 15 may be 1 μm to 100 μm, for example.

The cathode active material layer 16 includes a cathode active material configured to be able to occlude and discharge charge carriers such as lithium ions. Examples of the cathode active material include lithium composite metal oxide having a layered rock salt structure, metal oxide having a spinel structure, a polyanionic compound, and the like. The cathode active material may be any material capable of being used for the lithium ion secondary battery. The cathode active material layer 16 may include a plurality of cathode active materials. In the present embodiment, the cathode active material layer 16 includes olivine type lithium iron phosphate ($LiFePO_4$) as complex oxide.

The anode active material layer 17 includes an anode active material configured to be able to occlude and discharge charge carriers such as lithium ions. The anode active material may be any of a single material, alloy, and a compound. Examples of the anode active material include lithium, carbon, a metal compound, and the like. The anode active material may be an element capable of being alloyed with lithium, a compound thereof, or the like. Examples of carbon include natural graphite, artificial graphite, hard carbon (non-graphitizable carbon), soft carbon (easily graphitizable carbon), or the like. Examples of the artificial graphite include highly oriented graphite, meso-carbon microbeads, and the like. Examples of the element capable of being alloyed with lithium include silicon (silicon), tin, or the like. In the present embodiment, the anode active material layer 17 includes graphite as a carbon-based material.

Each of the cathode active material layer 16 and the anode active material layer 17 (hereinafter, also simply referred to as an "active material layer") may further include a conductive assistant for enhancing electrical conductivity as needed, a binding agent, an electrolyte (a polymer matrix, an ion conductive polymer, the electrolytic solution 19, and the like), electrolyte supporting salt (lithium salt) for enhancing ion conductivity, and the like. The conductive assistant is added to enhance electrical conductivity of each of the electrodes 11, 12, and 13. The conductive assistant is, for example, an acetylene black, a carbon black, graphite, or the like.

Components contained in the active material layer or a compounding ratio of the components, and the thickness of the active material layer are not particularly limited, and well-known knowledge about a lithium ion secondary battery may be appropriately referred to. The thickness of the active material layer is, for example, 2 to 150 μm. The active material layer may be formed on the surface of the current collector 15 by a well-known method such as a roll coating method. A heat-resistant layer may be disposed on a surface of the current collector 15 (one surface or both surfaces) or a surface of the active material layer to improve thermal stability of each of the electrodes 11, 12, and 13. The heat-resistant layer includes an inorganic particle and a binding agent, for example, and may additionally include an additive such as a thickener.

Examples of the binding agent include a fluorine-containing resin such as polyvinylidene fluoride, poly-tetrafluoroethylene, or fluororubber, a thermoplastic resin such as polypropylene and polyethylene, an imide-based resin such as polyimide and polyamide-imide, an alkoxysilyl group-containing resin, an acrylic resin such as acrylic acid or methacrylic acid, styrene butadiene rubber (SBR), carboxymethyl cellulose, alginate such as sodium alginate or ammonium alginate, water-soluble cellulose ester cross-linked material, a starch-acrylic acid graft polymer, and the like. These binding agents may be singly used, or used in combination. Examples of a solvent include water, N-methyl-2-pyrrolidone (NMP), and the like.

The separator 14 may be, for example, nonwoven fabric or a porous sheet containing a polymer that absorbs and holds an electrolyte. Examples of the material of the separator 14 include, for example, polypropylene, polyethylene, polyolefin, polyester, and the like. The separator 14 may have a single layer structure or a multilayer structure. The multilayer structure may include, for example, a ceramic layer as an adhesive layer or a heat-resistant layer. The separator 14 may be impregnated with an electrolyte. Examples of the electrolyte impregnated in the separator 14 include a liquid electrolyte (electrolytic solution 19) containing a nonaqueous solvent and electrolyte salt dissolved in the nonaqueous solvent.

In a case in which the electrolytic solution 19 is impregnated in the separator 14, as the electrolyte salt, well-known lithium salt such as $LiClO_4$, $LiAsF_6$, $LiPF_6$, $LiBF_4$, $LiCF_3SO_3$, $LiN(FSO_2)_2$, and $LiN(CF_3SO_2)_2$ may be used. As the nonaqueous solvent, a well-known solvent such as cyclic carbonates, cyclic esters, chain carbonates, chain esters, ethers, or the like may be used. Two or more of these well-known solvent materials may be used in combination.

The sealing part 20 is formed at a peripheral part of the electrode laminate 10 to surround the electrode laminate 10. The sealing part 20 is joined to each of the first surface 15_a_ and the second surface 15_b_ of each current collector 15 at a peripheral part of the current collector 15. The sealing part 20 may be joined to at least one of the first surface 15*a* and the second surface 15*b* of each current collector 15. The sealing part 20 seals spaces S between the current collectors 15 and 15 of the adjacent bipolar electrodes 11 and 11, between the current collector 15 of the anode terminal electrode 12 and the current collector 15 of the bipolar electrode 11, and between the current collector 15 of the cathode terminal electrode 13 and the current collector 15 of the bipolar electrode 11. Hereinafter, "between the current collectors 15 and 15 of the adjacent bipolar electrodes 11 and 11", "between the current collector 15 of the anode terminal electrode 12 and the current collector 15 of the bipolar electrode 11", and "between the current collector 15 of the cathode terminal electrode 13 and the current collector 15 of the bipolar electrode 11" are simply referred to as "between the adjacent electrodes 11, 12, and 13".

The sealing part 20 has a rectangular frame shape when viewed from the laminating direction D of the electrodes 11, 12, and 13. The sealing part 20 includes a portion positioned between the adjacent electrodes 11, 12, and 13, and a portion positioned on an outer side of an edge of the current collector 15. Between the adjacent electrodes 11, 12, and 13, the sealing part 20 surrounds peripheries of the cathode active material layer 16 and the anode active material layer 17, and the space S is formed by the adjacent current collectors 15 and 15 and the sealing part 20.

The electrolytic solution 19 is accommodated in the space S. The sealing part 20 seals the electrolytic solution 19 in the space S. The sealing part 20 may prevent moisture from entering the space S from the outside of the power storage module 1. The sealing part 20 also prevents gas generated from each of the electrodes 11, 12, and 13 due to charge/discharge reaction and the like, for example, from leaking out to the outside of the power storage module 1. Part of the sealing part 20 is disposed between the adjacent current collectors 15 and 15, so that the sealing part 20 also functions as a spacer that keeps an interval between the pair of current collectors 15 and 15. The sealing part 20 is separated from the cathode active material layer 16 and the anode active material layer 17 when viewed from the laminating direction D. The portion positioned on the outer side of the edge of the current collector 15 when viewed from the laminating direction D extends in the laminating direction D from the anode terminal electrode 12 disposed at an end in the laminating direction D of the electrode laminate 10 to the cathode terminal electrode 13 disposed at the other end in the laminating direction D, and couples respective portions positioned between the current collectors 15 and 15 of the adjacent electrodes 11, 12, and 13.

The sealing part 20 includes an insulating material, and prevents a short circuit from being caused between the adjacent current collectors 15 and 15 by insulating between the adjacent current collectors 15 and 15. Examples of the material constituting the sealing part 20 include resin materials such as polypropylene, polyethylene, polystyrene, an ABS resin, and an AS resin, and a material obtained by modifying these resin materials.

Figure 2:
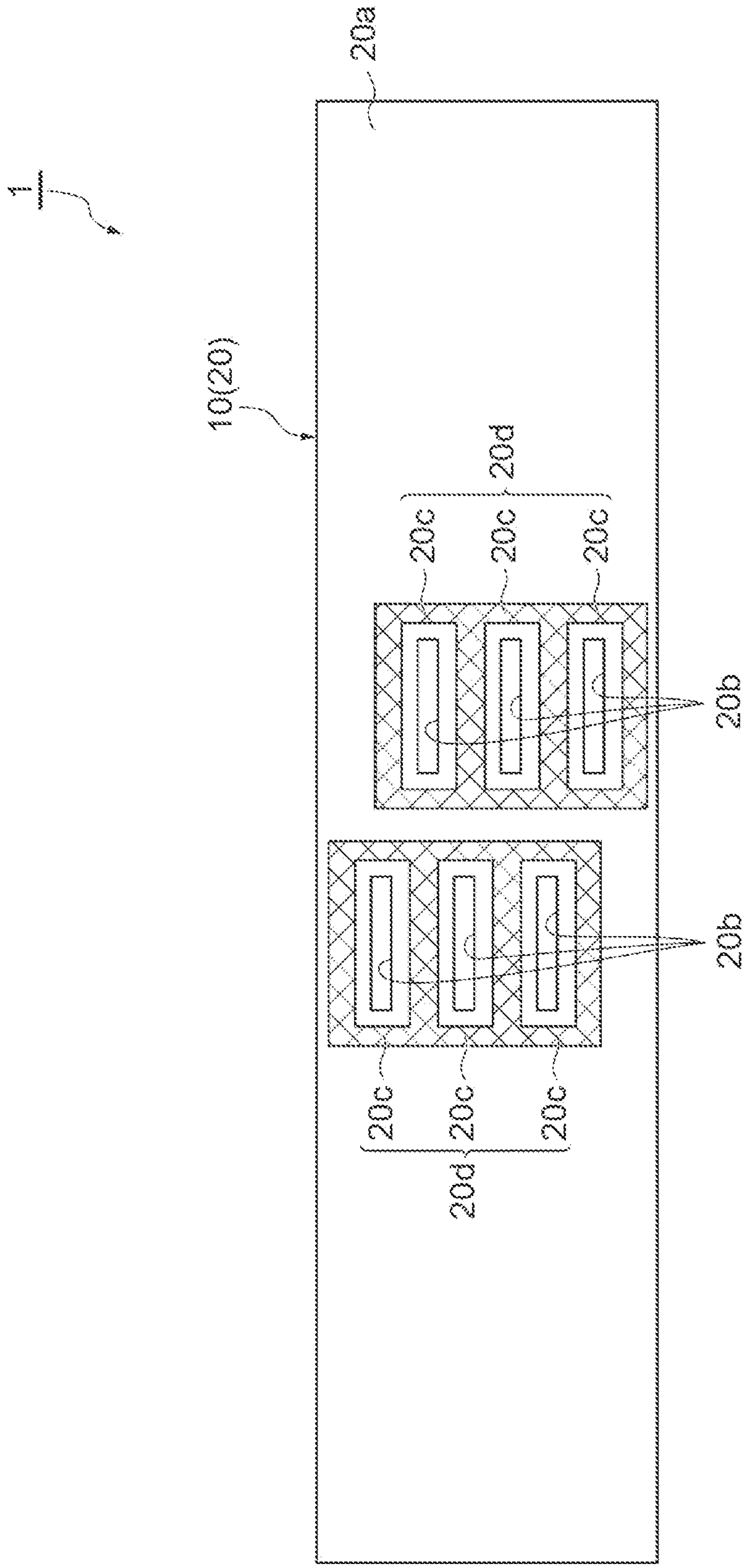
FIG. 2 is a side view of an electrode laminate viewed from the X-axis direction.

The sealing part 20 includes a main body part 21 configured to cover a lateral side of the electrode laminate 10 (both end portions in the X-axis direction of the electrode laminate 10, and both end portions in the Y-axis direction of the electrode laminate 10), and a pair of projecting parts 22 projecting in the Z-axis direction from the main body part 21. The projecting parts 22 are disposed at an upper end and a lower end of a portion of the main body part 21 where an opening 20*b* is formed. As illustrated in FIG. 1 and FIG. 2, a plurality of the openings 20*b* are formed on the sealing part 20 for supplying the electrolytic solution 19 to the respective spaces S at a step of manufacturing the power storage module 1. The opening 20*b* connects the inside and the outside of each space S, and opens in a direction orthogonal to the laminating direction D (second direction).

Specifically, the openings 20*b* are opened on a side surface 20*a* extending along the laminating direction D of the sealing part 20. The openings 20*b* communicating with the respective spaces S are disposed to be separated from each other in a direction (Y-axis direction) orthogonal to both of the laminating direction D and the X-axis direction so that the openings 20*b* and 20*b* formed in the spaces S adjacent to each other in the laminating direction D do not overlap each other in the laminating direction D.

On the other hand, some of the openings 20*b* communicating with the respective spaces S that are not adjacent to each other in the laminating direction D are disposed to overlap each other in the laminating direction D so that positions thereof in the Y-axis direction agree with each other. In the present embodiment, the six spaces S are formed in the power storage module 1, the three openings 20*b* respectively communicating with the three spaces S, which are disposed at odd number positions counting from an end in the laminating direction D, are disposed to overlap each other in the laminating direction D. While being separated from the three openings 20*b* in the Y-axis direction, the three openings 20*b* respectively communicating with the three spaces S, which are disposed at even number positions counting from an end in the laminating direction D, are disposed to overlap each other in the laminating direction D.

On the side surface 20*a* of the sealing part 20 on which the openings 20*b* are disposed, frame parts 20*c* projecting from the side surface 20*a* are formed to surround the respective openings 20*b*. Among the frame parts 20*c*, the frame parts 20*c* surrounding the openings 20*b* that are disposed to overlap each other in the laminating direction D are coupled to each other to configure a frame part coupling body 20*d*. In the sealing part 20 of the present embodiment, configured are the frame part coupling body 20*d* obtained by coupling the three frame parts 20*c* respectively surrounding the three openings 20*b* at odd number positions counting from an end in the laminating direction D, and the frame part coupling body 20*d* obtained by coupling the three frame parts 20*c* respectively surrounding the three openings 20*b* at even number positions counting from an end in the laminating direction D. In FIG. 2, the frame part 20*c* and the frame part coupling body 20*d* are emphasized by cross hatching.

A sealing sheet 25 is disposed at a distal end in a projecting direction (X-axis direction) of each of the frame parts 20*c* (frame part coupling bodies 20*d*). The sealing sheet 25 is joined to the entire periphery of the distal end of each frame part 20*c* to cover and seal the opening 20*b* surrounded by the frame part 20*c*. FIG. 2 illustrates the power storage module 1 in a state in which the sealing sheet 25 is omitted.

Figure 3:
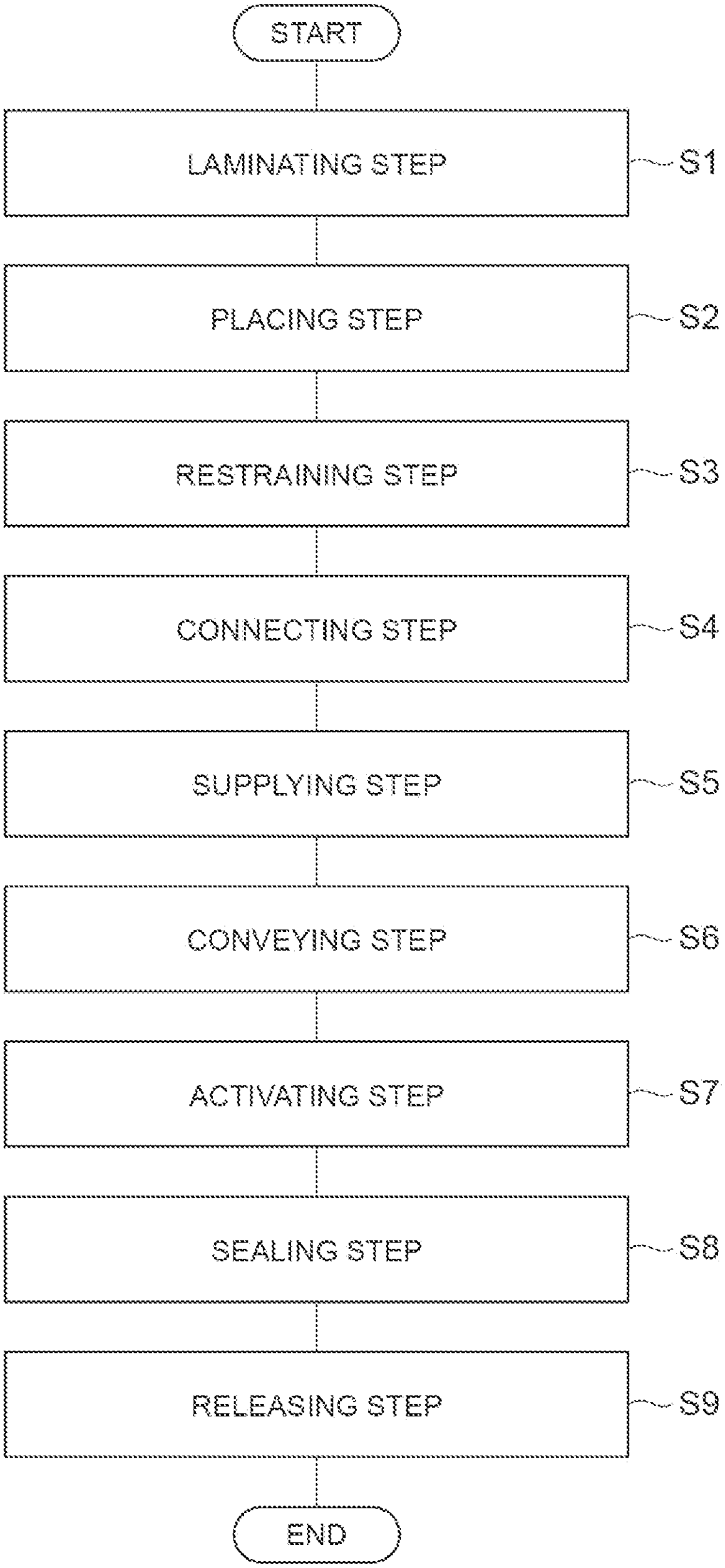
FIG. 3 is a flowchart illustrating an example of a method for manufacturing the power storage module according to the embodiment.

Next, the following describes an example of the method for manufacturing the power storage module 1 mainly with reference to FIG. 3. First, by laminating the electrodes 11, 12, and 13, the electrode laminate 10 (laminate) before each opening 20*b* of the power storage module 1 illustrated in FIG. 1 is sealed is prepared (laminating step S1). At this point, the sealing sheet 25 is not disposed at the distal end of each frame part 20*c*, and each opening 20*b* is opened and exposed on the side surface 20*a*. In the following description, for convenience' sake, the electrode laminate 10 before each opening 20*b* is sealed may be simply referred to as the electrode laminate 10.

Subsequently, the electrode laminate 10 is placed on one of the pair of restraint members 30 and 30 (conveyance palette) (herein, the restraint member 30 placed on a lower side in the Z-axis direction) constituting a first unit 100 (refer to FIG. 4 to FIG. 7), which will be described in a later section in detail, so that the laminating direction D of the electrode runs along the Z-axis direction (vertical direction) (placing step S2). Particularly, in a case in which the power storage module 1 is flat and large in the laminating direction D of the electrode as described above, the electrode laminate 10 is preferably placed so that the laminating direction D of the electrode runs along the Z-axis direction for stability. Hereinafter, a direction along the vertical direction is referred to as the Z-axis direction (first direction), a direction orthogonal to the Z-axis direction and running along the horizontal direction is referred to as the X-axis direction (second direction), and a direction orthogonal to both of the Z-axis direction and the X-axis direction and running along the horizontal direction is referred to as the Y-axis direction.

Subsequently, the first unit 100 configured to restrain the electrode laminate 10 in the Z-axis direction with a predetermined pressure is attached to the electrode laminate 10 (restraining step S3). More specifically, first, on the electrode laminate 10 that is placed on one of the pair of restraint members 30 and 30, the other one of the pair of restraint members 30 and 30 is placed to form a held body HB in which the electrode laminate 10 is held between the pair of restraint members 30 and 30. Subsequently, the held body HB is compressed in the Z-axis direction, and the compressed held body HB is held between the pair of regulation members 40 and 40. A method for attaching the pair of regulation members 40 and 40 to the held body HB will be described in a later section in detail.

The compressed held body HB tries to extend in the Z-axis direction, and the extension thereof is regulated by the pair of regulation members 40 and 40. That is, the held body HB is restrained by the pair of regulation members 40 and 40 in a state of being compressed in the laminating direction D. At the restraining step S3, the pair of restraint members 30 and 30 is attached to the electrode laminate 10 so that side surfaces 30*e* and 30*e* of the pair of restraint members 30 and 30 are flush with the side surface 20*a* of the electrode laminate 10 on which the opening 20*b* is formed.

Figure 8:
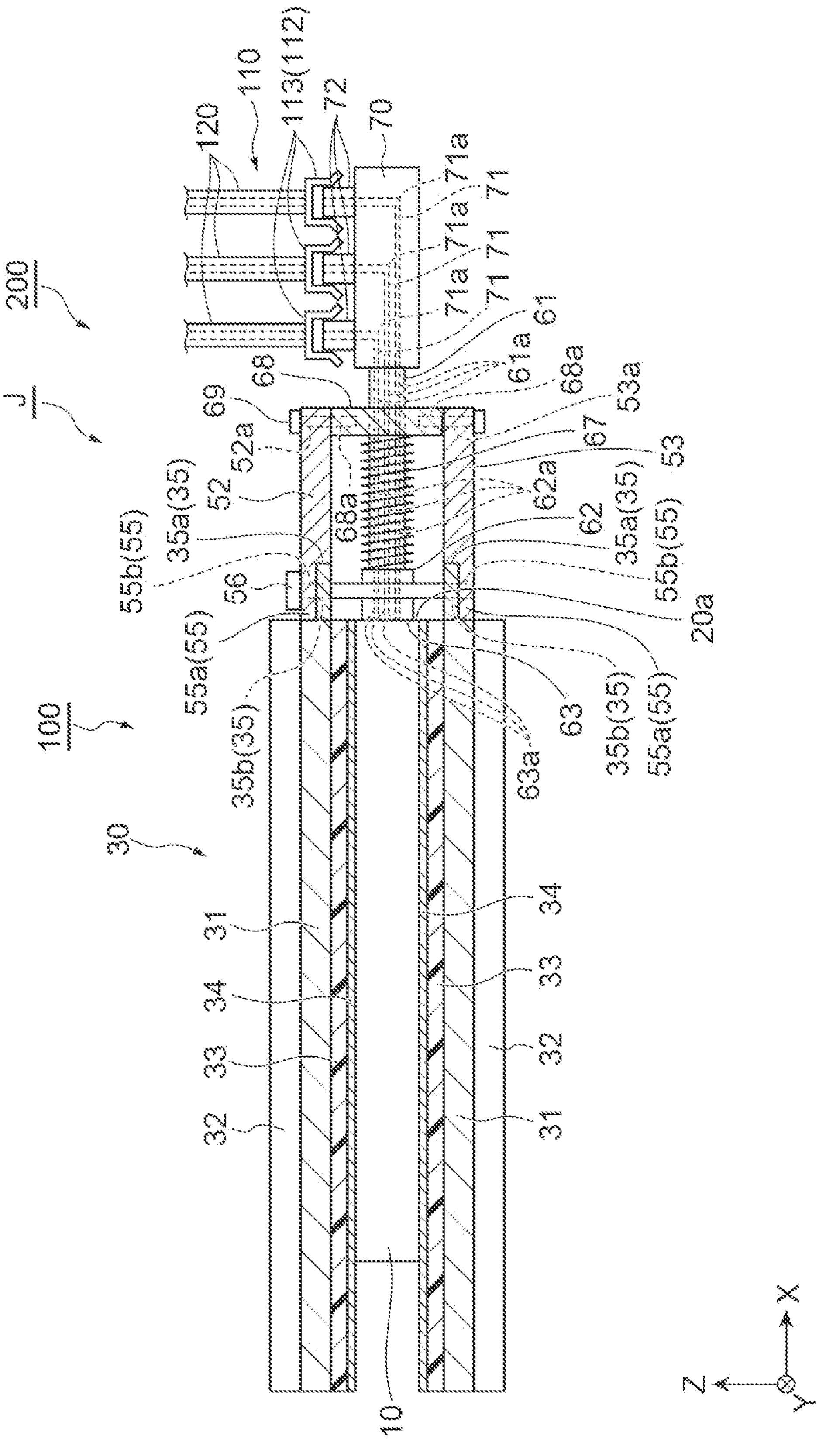
FIG. 8 is a cross-sectional view of a state in which the second unit is attached to the first unit viewed from the Y-axis direction.

Subsequently, as illustrated in FIG. 8, prepared is a second unit (flow channel unit) 200 including a first connection part 63, a second connection part 72, and flow channels 61*a*, 62*a*, 63*a*, and 71 configured to cause the first connection part 63 to communicate with the second connection part 72. A flow channel part 60 is then connected to the opening 20*b* of the electrode laminate 10 that is placed at the placing step S2 so that a connecting portion of the second connection part 72 with respect to a connected part 110 is positioned on an upper side in the Z-axis direction than a connecting portion of the first connection part 63 with respect to the opening 20*b* (connecting step S4). At the connecting step S4, the first connection part 63 is connected to the opening 20*b* by pressing the first connection part 63 against the electrode laminate 10. At the connecting step S4, when the second unit 200 is attached to the first unit 100, the flow channel part 60 (first connection part 63) is connected to the opening 20*b* of the electrode laminate 10. A procedure of attaching the second unit 200 to the first unit 100 will be described in a later section in detail.

Subsequently, a distal end part 113 (the connected part 110) of a supply pipe 120 for the electrolytic solution 19 is connected to the second connection part 72, and the electrolytic solution 19 is supplied to the space S of the electrode laminate 10 via the second unit 200 (supplying step S5). When supply of the electrolytic solution 19 to the space S is finished, the distal end part 113 of the supply pipe 120 is removed from the second connection part 72. Next, the electrode laminate 10, which is placed on one of the restraint members 30 so that the laminating direction D runs along the Z-axis direction, is conveyed to a place where the next step is performed (conveying step S6). The electrode laminate 10 is conveyed while the first unit 100 and the second unit 200 are kept being attached thereto, that is, the first connection part 63 of the second unit 200 is kept being connected to the opening 20*b* of the electrode laminate 10.

Although not illustrated, in a case in which a valve for opening and closing communication between the outside and the flow channel 71 is disposed on the second connection part 72, the valve may be closed when the distal end part 113 of the supply pipe 120 is removed from the second connection part 72. As such a valve, a one-touch coupling may be used, the one-touch coupling caused to be in an opened state when the connected part 110 is connected and caused to be in a closed state when the connected part 110 is removed. A check valve may be disposed on the second connection part 72. With these configurations, it is possible to reliably prevent the electrolytic solution 19 from leaking out from the second connection part 72, and prevent foreign substances and the like from entering the flow channel 71 and the electrode laminate 10 by extension from the second connection part 72.

Subsequently, at the predetermined place where the electrode laminate 10 is conveyed to at the conveying step S6, the electrode laminate 10 in a state in which the first unit 100 and the second unit 200 are attached thereto is housed in a charging and discharging device. The electrode laminate 10 housed in the charging and discharging device is activated by being charged by an external power source via the restraint members 30 and 30 (power source connection parts 34 and 34) (activating step S7). At the activating step S7, gas generated in the space S of the electrode laminate 10 due to the activation is discharged via the second connection part 72. That is, the gas discharged from the opening 20*b* of the electrode laminate 10 is discharged from the second connection part 72 via the first connection part 63 and the flow channels 61*a*, 62*a*, 63*a*, and 71. At the activating step S7 of the present embodiment, a connection part (connected part 110) of a gas bag for collecting gas is connected to the second connection part 72. As the gas bag, for example, a bag made of resin is used.

Subsequently, a posture of the electrode laminate 10 is changed so that the opening 20*b* of the electrode laminate 10 is oriented in a vertically upward direction, and the second unit 200 is removed from the first unit 100 thereafter. That is, the first connection part 63 is removed from the opening 20*b* of the electrode laminate 10. Due to this, the side surface 20*a* and the opening 20*b* of the sealing part 20 are exposed. Subsequently, the opening 20*b* is sealed (sealing step S8). Sealing of the opening 20*b* is performed by thermally welding the sealing sheet 25 to the distal end of the frame part 20*c* surrounding each opening 20*b*, for example. Subsequently, the first unit 100 restraining the electrode laminate 10 is removed from the electrode laminate 10 (releasing step S9).

Figure 4:
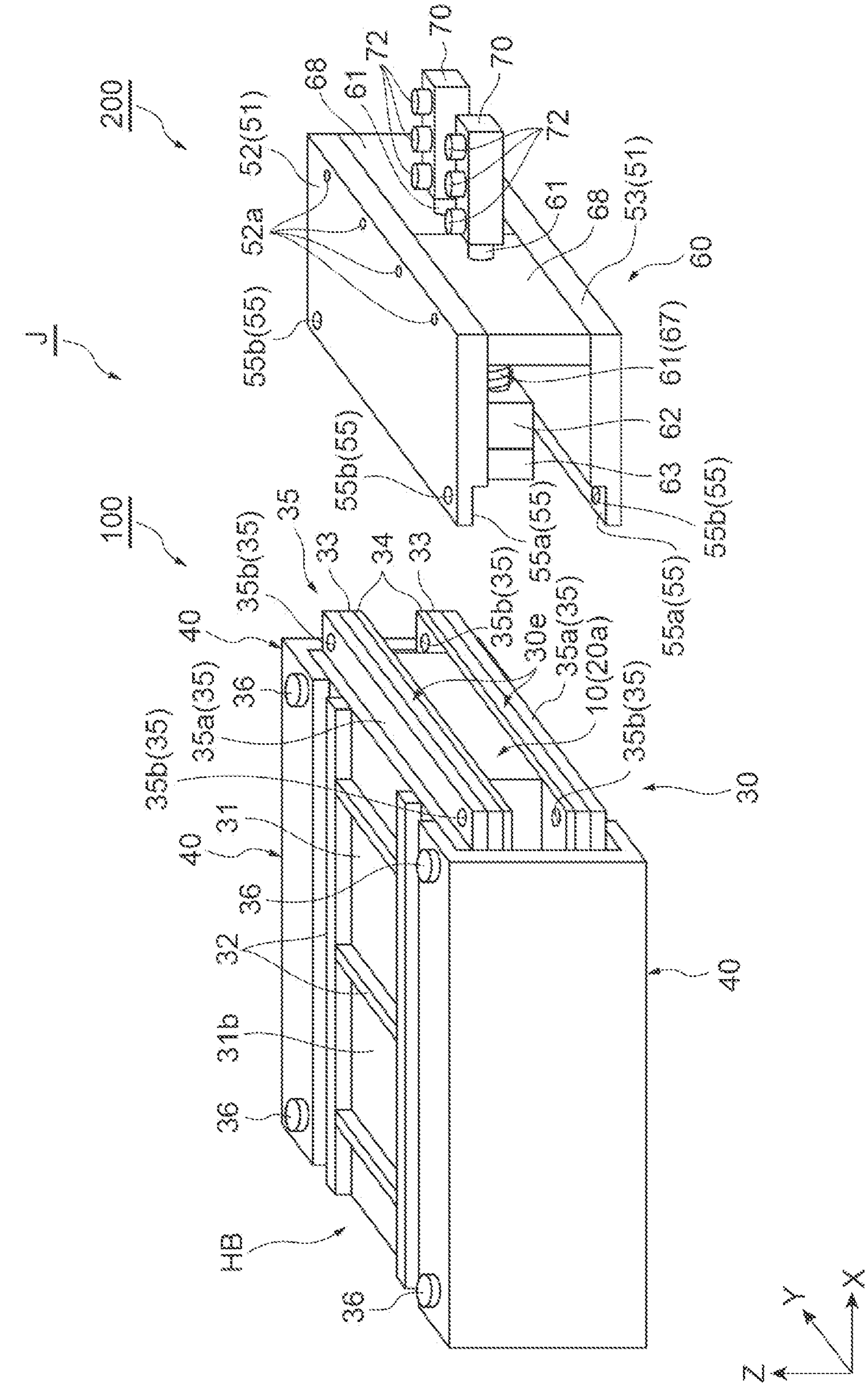
FIG. 4 is a perspective view illustrating a first unit and a second unit.

Next, the following describes in detail a restraint jig J used in a series of steps in the method for manufacturing the power storage module 1 described above. As illustrated in FIG. 4, the restraint jig J includes the first unit 100 and the second unit 200. The second unit 200 is disposed to be freely attached to or detached from the first unit 100.

Figure 5:
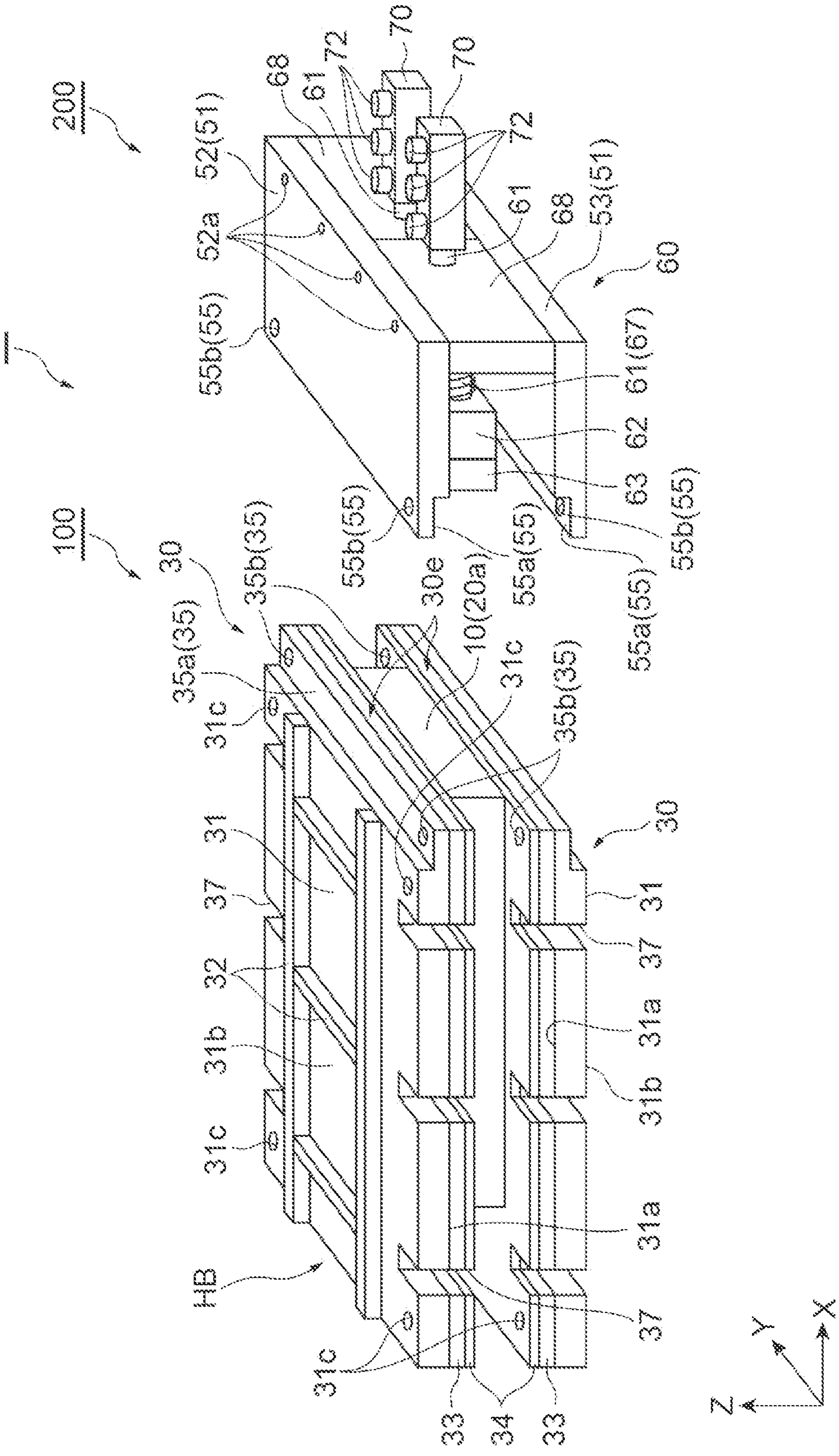
FIG. 5 is a perspective view illustrating the first unit and the second unit in a state in which a pair of regulation members is removed.
Figure 6:
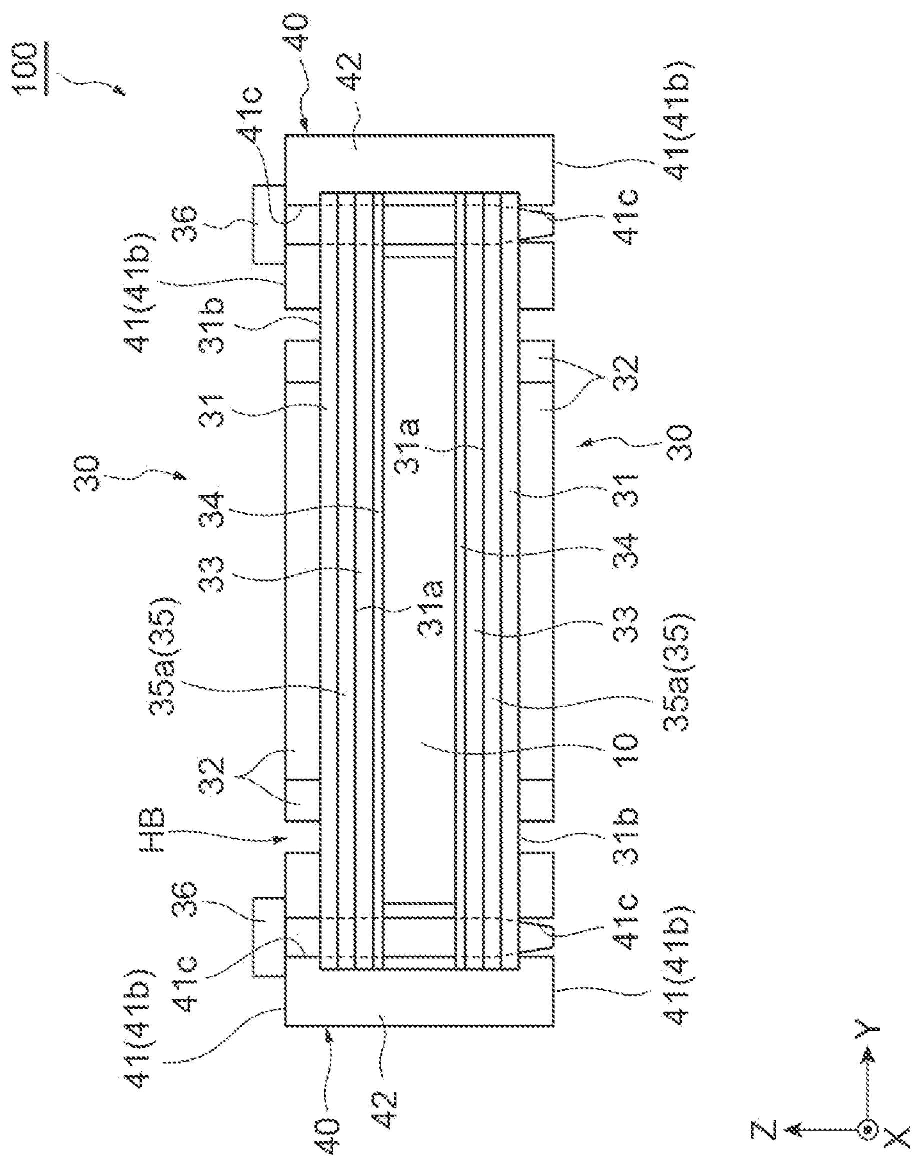
FIG. 6 is a side view illustrating the first unit in a state of holding a held body viewed from the X-axis direction.
Figure 7:
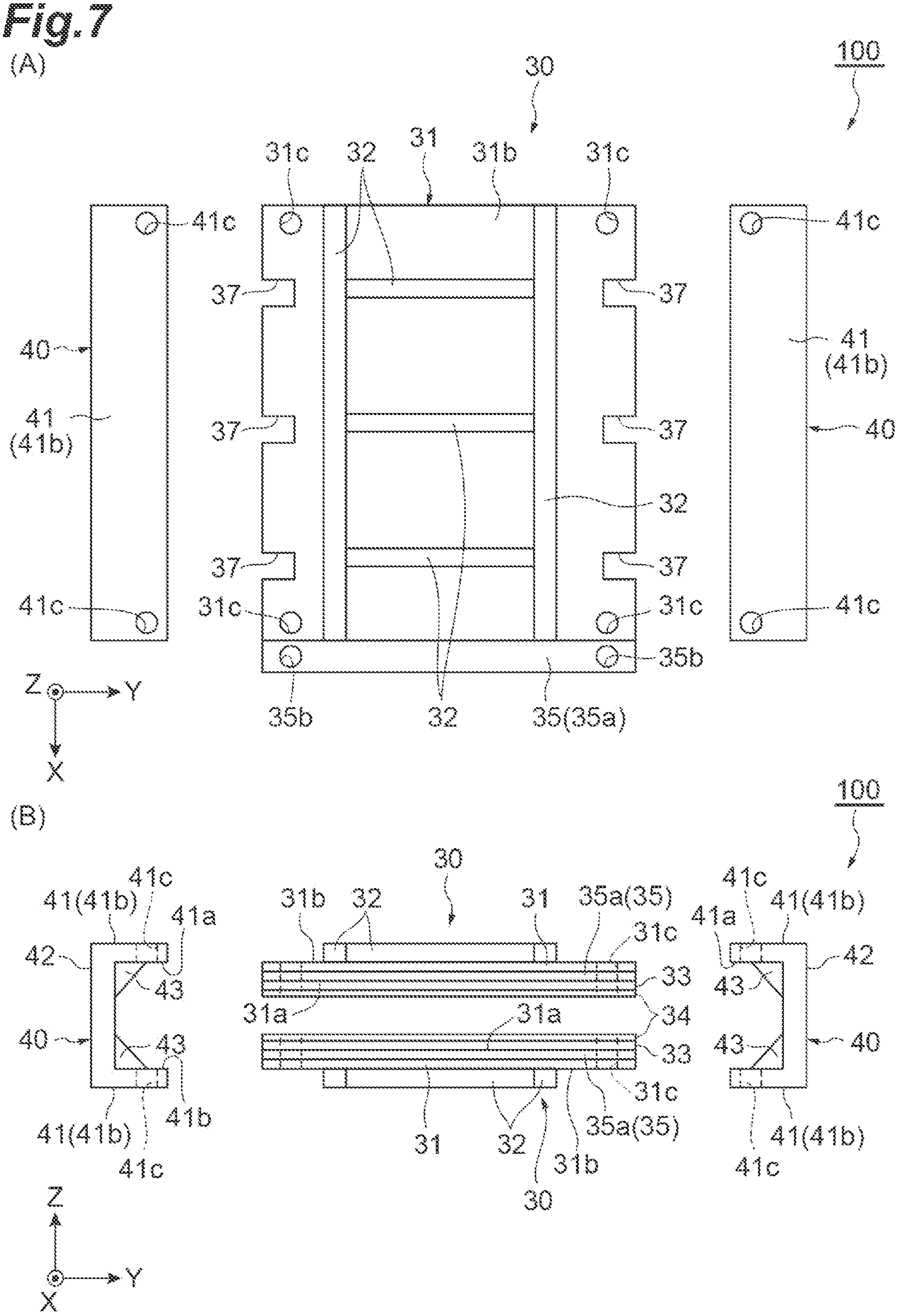
FIG. 7(A) is a top view of a restraint member and the regulation member viewed from the Z-axis direction.
FIG. 7(B) is a side view of the restraint member and the regulation member viewed from the X-axis direction.

The first unit 100 restrains the electrode laminate 10 in which the electrodes are laminated in the Z-axis direction (first direction) in a state of applying a restraining load in the Z-axis direction thereto. As illustrated in FIG. 4 to FIG. 6, the first unit 100 includes the pair of restraint members 30 and 30, the pair of regulation members 40 and 40, and insertion members 36. The pair of restraint members 30 and 30 is disposed at both ends in the Z-axis direction (laminating direction) of the electrode laminate 10. Each of the pair of restraint members 30 and 30 is formed of a material such as stainless steel, aluminum, or iron, for example. Each of the pair of restraint members 30 and 30 includes a main body part 31, an elastic body 33, and the power source connection part 34.

The main body part 31 includes an inner surface 31*a* on the electrode laminate 10 side and an outer surface 31*b* on the opposite side of the inner surface 31*a*. The main body part 31 includes a projecting rib 32 projecting from the outer surface 31*b* toward the outer side of the electrode laminate 10. The projecting rib 32 is disposed for improving the strength of the restraint member 30. When the held body HB is held between the regulation members 40, which will be described in a later section in detail, the projecting rib 32 projects from the outer surface 31*b* to have the same height as that of a contact part 41 of the regulation member 40 or to be higher than the contact part 41 in the Z-axis direction. The held body HB is a laminate constituted of the electrode laminate 10 and the pair of restraint members 30 and 30 disposed at both ends in the Z-axis direction. In the present embodiment, the projecting rib 32 and the contact part 41 are formed to be flush with each other. Due to this, the first unit 100 in a state of holding the held body HB can be placed on a plane part in a stable state.

The elastic body 33 is fixed to the inner surface 31*a* of the main body part 31. Examples of the elastic body 33 include a disc spring or a rubber member having an insulation property. In a case of fixing the rubber member, the rubber member is formed so that the size thereof in plan view viewed from the Z-axis direction is equal to the size of the main body part 31 in plan view. In a case in which the disc spring has electrical conductivity, an insulating sheet member is disposed between the disc spring and the main body part 31, or the inner surface 31*a* of the main body part 31 is coated by an insulating material. Additionally, the power source connection part 34 having electrical conductivity, which is used for charge and discharge at the activating step S7, may be fixed to the elastic body 33. That is, the power source connection part 34 is fixed to a surface of the elastic body 33 on the opposite side of the main body part 31. When the restraint members 30 hold the held body HB therebetween, the elastic body 33 and the power source connection part 34 are disposed between the main body part 31 and the electrode laminate 10 in the Z-axis direction. The present embodiment describes an example in which the elastic body 33 is disposed on each of the pair of restraint members 30 and 30, but the elastic body 33 may be disposed on only one of the pair of restraint members 30 and 30.

Each of the pair of restraint members 30 and 30 is formed to have a rectangular shape, and insertion holes 31*c* through which the insertion members 36 are inserted are formed at four corners of each of the restraint members 30 and 30. A cutout part 37 into which a reinforcing rib 43 of the regulation member 40 is inserted, which will be described in a later section in detail, is formed on each of two sides opposed to each other in the Y-axis direction of the restraint member 30. That is, cutout parts 37 are disposed so that forming positions and the number thereof correspond to those of reinforcing ribs 43 disposed on the regulation member 40.

A fixing part 35 for freely attaching or detaching the first unit 100 and the second unit 200 is formed on each of the pair of restraint members 30 and 30. The fixing part 35 includes overhang parts 35*a* and 35*a* projecting in the X-axis direction as an attaching and detaching direction of the pair of restraint members 30 and 30, and insertion holes 35*b* and 35*b* formed on the respective overhang parts 35*a* and 35*a*. A procedure of attaching and detaching the first unit 100 and the second unit 200 via the fixing part 35 will be described in a later section in detail.

The pair of regulation members 40 and 40 holds both ends in the Y-axis direction orthogonal to (intersecting with) the Z-axis direction of the held body HB in a state of being compressed in the Z-axis direction. Each of the pair of regulation members 40 and 40 is formed of the same material as that of the restraint member 30, for example. Each of the pair of regulation members 40 and 40 includes a pair of contact parts 41 and 41, a connection part 42, and the reinforcing ribs 43.

Each of the pair of contact parts 41 and 41 is formed in a plate shape to be orthogonal to the Z-axis direction and brought into contact with each of a pair of main body parts 31 and 31 of the held body HB from the outer side in the Z-axis direction. The size of the contact part 41 in the X-axis direction is the same as the size of the electrode laminate 10 or longer than the size of the electrode laminate 10 in the X-axis direction. The size of the contact part 41 in the X-axis direction is the same as the size of the restraint member 30 of the held body HB in the X-axis direction. The contact part 41 includes an inner surface 41*a* of the contact part 41 being in contact with the outer surface 31*b* of the main body part 31 and an outer surface 41*b* on the opposite side of the inner surface 41*a*. Additionally, insertion holes 41*c* through which the insertion members 36 are inserted are formed on the pair of contact parts 41 and 41. The two insertion holes 41*c* are formed in the vicinity of end parts of the contact part 41 in the X-axis direction.

The connection part 42 is formed in a plate shape to be orthogonal to the Y-axis direction and connect the pair of contact parts 41 and 41. The size of the connection part 42 in the X-axis direction is the same as the size of the electrode laminate 10 or longer than the size of the electrode laminate 10 in the X-axis direction. The size of the connection part 42 in the X-axis direction is the same as the sizes of the restraint member 30 of the held body HB and the contact part 41 in the X-axis direction. The shape of the regulation member 40 configured by the pair of contact parts 41 and 41 and the connection part 42 is a U-shape when viewed from the X-axis direction.

The reinforcing rib 43 is a plate-shaped part that connects the contact part 41 to the connection part 42, and is formed to have a triangular shape when viewed from the X-axis direction. The reinforcing rib 43 is disposed to reinforce the strength of the regulation member 40. The reinforcing rib 43 is disposed on (inserted into) the cutout part 37 formed on the restraint member 30 when the held body HB is held between the regulation members 40.

The insertion member 36 is a rod-like member configured to be inserted into the insertion hole 31*c* of the restraint member 30 and the insertion hole 41*c* of the regulation member 40. More specifically, on the pair of contact parts 41 and 41 and the pair of restraint members 30 and 30, (a plurality of) through holes (that is, insertion holes 31*c* and insertion holes 41*c*) passing through both of the pair of contact parts 41 and 41 and the pair of restraint members 30 and 30 in the Z-axis direction are formed at four points in plan view viewed from the Z-axis direction in a state in which the pair of regulation members 40 and 40 holds the held body HB therebetween. The insertion members 36 are inserted into the respective through holes in a state in which the pair of regulation members 40 and 40 holds the held body HB therebetween.

The insertion member 36 is formed of, for example, engineering plastic such as polyacetal, polyether ether ketone, polyamide, and the like. When the insertion members 36 are inserted into the respective through holes (that is, the insertion holes 31*c* and the insertion holes 41*c*) in a state in which the pair of regulation members 40 and 40 holds the held body HB, relative positions of the pair of regulation members 40 and 40 with respect to the pair of restraint members 30 and 30 are fixed. In other words, when the insertion members 36 are inserted into the insertion holes 31*c* of the restraint members 30 and the insertion holes 41*c* of the regulation members 40 in a state in which the held body HB including the restraint members 30 is held between the pair of regulation members 40 and 40, the regulation members 40 are positioned with respect to the restraint members 30.

The following describes a procedure of restraining the electrode laminate 10 using the first unit 100 at the restraining step S3. The electrode laminate 10 described above is compressed via the pair of restraint members 30 and 30 disposed at both ends in the Z-axis direction, and the held body HB is formed. A size of the height (thickness) in the Z-axis direction of the held body HB before being compressed is longer than a distance between the pair of contact parts 41 and 41 of the regulation member 40 in the Z-axis direction. The size of the height in the Z-axis direction of the held body HB after being compressed is shorter than the distance between the pair of contact parts 41 and 41 of the regulation member 40 in the Z-axis direction. Next, the pair of regulation members 40 and 40 described above is prepared.

Next, the held body HB in a compressed state is held between the pair of regulation members 40 described above. More specifically, the held body HB in a state of being compressed in the Z-axis direction is inserted between the pair of contact parts 41 and 41 of the pair of regulation members 40 so that the reinforcing ribs 43 of the pair of regulation members 40 are respectively inserted into the cutout parts 37 of the pair of restraint members 30 and 30. Compression of the held body HB is then released. Due to this, extension in the Z-axis direction of the held body HB caused when the compression is released is regulated by the pair of regulation members 40. The held body HB is firmly held between the pair of regulation members 40, and maintained in a state of being restrained in the Z-axis direction.

Shape dimensions of the first unit 100 in the present embodiment are defined so that the respective contact parts 41 and 41 of the pair of regulation members 40 and 40 become line symmetric with respect to respective edges of the pair of restraint members 30 and 30 with a line along the X-axis direction as a symmetric axis so that a load is uniformly applied to the entire held body HB. Additionally, the entire shape of each of the pair of restraint members 30 and 30 is formed so that outer dimensions, a thickness, rib arrangement, a rib shape, and the like, for example, become the same. Due to this, a load can be caused to uniformly work on the entire electrode laminate 10.

Next, the following describes the second unit 200 in detail. As illustrated in FIGS. 4, 5, and 8, when being pressed against the frame part coupling body 20*d* formed on the electrode laminate 10 to be connected to each opening 20*b*, the second unit 200 causes each space S formed in the electrode laminate 10 to communicate with the connected part 110. Examples of the connected part 110 include the distal end part 113 of the supply pipe 120 for the electrolytic solution 19 connected at the supplying step S5, a connection part (not illustrated) of an exhaust pipe for gas generated in the space S connected at the activating step S7, a connection part of a gas bag for collecting gas, or the like. The second unit 200 includes a base part 51 and the flow channel part 60.

The base part 51 supports the flow channel part 60. The flow channel part 60 is connected to the opening 20*b* of the electrode laminate 10 to communicate with the space S. Flow channel parts 60 are disposed so that the number thereof corresponds to the number of the frame part coupling bodies 20*d* formed on the electrode laminate 10. The present embodiment describes an example in which the two flow channel parts 60 are disposed in the second unit 200. For convenience of explanation, the specific numbers of the frame part coupling bodies 20*d* and openings 20*b* are not illustrated in FIGS. 4, 5, 6, 11, 14(A), 21, 22, and 23, and the number of the flow channel parts 60 is not illustrated in FIGS. 21, 22, and 23.

The base part 51 includes a first base part 52 and a second base part 53. The first base part 52 and the second base part 53 hold the flow channel part 60 therebetween, and support the flow channel part 60 to be freely attached or detached. The flow channel part 60 includes a main body pipe 61, a nozzle 62, the first connection part 63, an elastic part 67, an attachment part 68, and a connection member 70.

The main body pipe 61 is a pipe member extending in the X-axis direction and including a plurality of flow channels 61*a* configured to circulate a medium (for example, the electrolytic solution 19) exchanged between the space S of the electrode laminate 10 and the connected part 110 when being connected to the opening 20*b* of the electrode laminate 10. The nozzle 62 is attached to a distal end of the main body pipe 61, and a plurality of flow channels 62*a* are formed thereon to communicate with the respective flow channels 61*a* of the main body pipe 61. To a distal end of the nozzle 62 (an end part on the opposite side of a side to which the main body pipe 61 is attached in the X-axis direction), the first connection part 63 configured to liquid-tightly connect the opening 20*b* of the electrode laminate 10 and the flow channel part 60 (flow channels 61*a*, 62*a*, 63*a*, and 71) is fixed.

Figure 9:
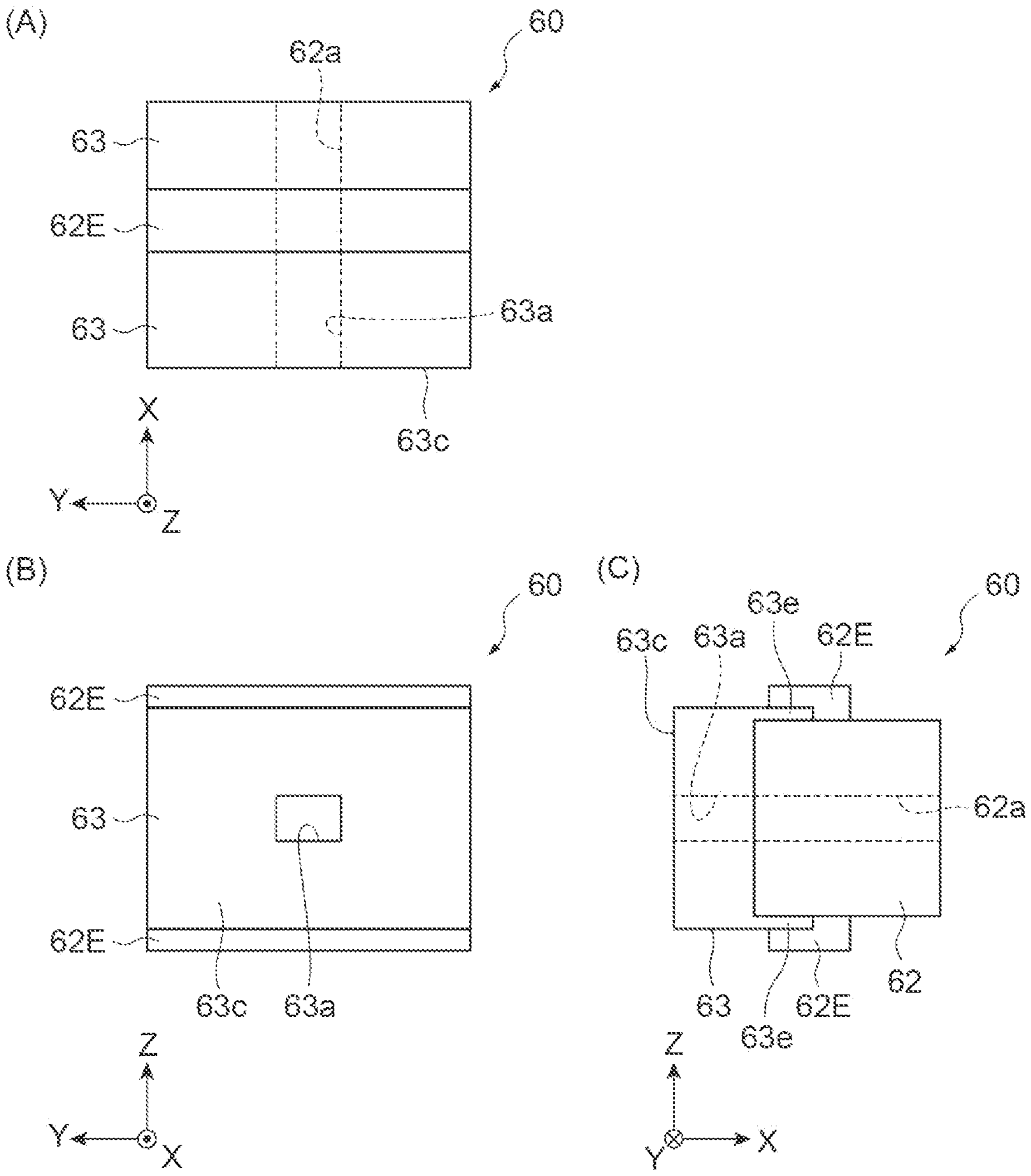
FIG. 9(A) is a top view of a first connection part and a nozzle viewed from the Z-axis direction.
FIG. 9(B) is a front view of the first connection part viewed from the X-axis direction.
FIG. 9(C) is a side view of the first connection part and the nozzle viewed from the Y-axis direction.

The first connection part 63 is formed of a material having elasticity such as ethylene-propylene rubber and fluororubber. As illustrated in FIG. 9(C), the first connection part 63 is attached to the nozzle 62 by a grasping part 62E. The first connection part 63 is formed in a shape capable of being attached to the nozzle 62 by the grasping part 62E. Specifically, the first connection part 63 includes a portion 63*e* projecting from the distal end of the nozzle 62 and extending toward a base end of the nozzle 62 (main body pipe 61 side) in the X-axis direction. The grasping part 62E grasps the aforementioned extending portion 63*e* of the first connection part 63, for example, by screwing or pinching. By employing the grasping part 62E configured as described above, the first connection part 63 that is relatively thin in the X-axis direction can be attached to the nozzle 62. Regarding the first connection part 63 that is relatively thin in the X-axis direction, a deformation amount is small when being pressed against the electrode laminate 10, and durability of the first connection part 63 can be improved. The grasping part 62E is formed at a position distant from the distal end of the nozzle 62 in the X-axis direction. With this configuration, it is possible to prevent the grasping part 62E from interfering with the electrode laminate 10 when the first connection part 63 is connected to the opening 20*b* of the electrode laminate 10.

As illustrated in FIG. 9(A), FIG. 9(B), FIG. 9(C), and FIG. 10(A), the flow channels 63*a* communicating with the respective flow channels 62*a* are formed in the first connection part 63. The flow channels 61*a*, 62*a*, and 63*a* are disposed so that the number thereof corresponds to the number of the openings 20*b* surrounded by the respective frame parts 20*c* of the frame part coupling body 20*d*. In the flow channel part 60 in the present embodiment, the three flow channels 61*a*, the three flow channels 62*a*, and the three flow channels 63*a* are disposed for one frame part coupling body 20*d*. The flow channels 61*a*, 62*a*, and 63*a* are arranged along the Z-axis direction corresponding to the positions of the openings 20*b* in the frame part coupling body 20*d*.

Returning to FIGS. 4, 5, and 8, the attachment part 68 supports the main body pipe 61. More specifically, the main body pipe 61 is inserted into a through hole of the attachment part 68, and the attachment part 68 supports the main body pipe 61 to be movable in an extending direction of the main body pipe 61. The attachment part 68 is a member having a quadrangular prism shape, and attached to the first base part 52 and the second base part 53 to be freely attached or detached. On a side surface of the attachment part 68 opposed to the electrode laminate 10 in the X-axis direction, the elastic part 67 having a spring shape is disposed over the side surface and the nozzle 62. The elastic part 67 biases and supports the first connection part 63 (nozzle 62) so that the first connection part 63 projects from the first base part 52 and the second base part 53 in the X-axis direction when viewed from the Z-axis direction in a state in which the first connection part 63 is not pressed against the electrode laminate 10. When the first connection part 63 is pressed against the electrode laminate 10, the main body pipe 61 and the nozzle 62 move toward the attachment part 68 side in the X-axis direction (extending direction of the main body pipe 61). At this point, the elastic part 67 is compressed between the nozzle 62 and the attachment part 68, and biases the nozzle 62 and the first connection part 63 with respect to the electrode laminate 10. Insertion holes 52*a* are formed on the first base part 52, insertion holes 53*a* are formed on the second base part 53, and a pair of insertion holes 68*a* and 68*a* is formed on the attachment part 68.

When an insertion member 69 inserted into the insertion hole 52*a* of the first base part 52 is inserted into one of the insertion holes 68*a* of the attachment part 68, the first base part 52 and the attachment part 68 are fixed. When the insertion member 69 inserted into the insertion hole 52*a* of the first base part 52 is extracted from one of the insertion holes 68*a* of the attachment part 68, the first base part 52 is separated from the attachment part 68. Similarly, when the insertion member 69 inserted into the insertion hole 53*a* of the second base part 53 is inserted into the other one of the insertion holes 68*a* of the attachment part 68, the second base part 53 and the attachment part 68 are fixed. When the insertion member 69 inserted into the insertion hole 53*a* of the second base part 53 is extracted from the other one of the insertion holes 68*a* of the attachment part 68, the second base part 53 is separated from the attachment part 68.

A fixing part 55 for freely attaching or detaching the first unit 100 and the second unit 200 is formed on the first base part 52 and the second base part 53. The fixing part 55 includes overhang parts 55*a* and 55*a* projecting in the X-axis direction as an attaching and detaching direction of the first base part 52 and the second base part 53, and insertion holes 55*b* and 55*b* formed on the respective overhang parts 55*a* and 55*a*.

The following describes a procedure of attaching the second unit 200 to the first unit 100. In a state in which the overhang part 55*a* of the first base part 52 is overlapped with the overhang part 35*a* of one of the restraint members 30, when an insertion member 56 is inserted into the insertion hole 55*b* of the first base part 52 and the insertion hole 35*b* of one of the restraint members 30, the first base part 52 and the one restraint member 30 are fixed. In a state in which the overhang part 55*a* of the second base part 53 is overlapped with the overhang part 35*a* of the other one of the restraint members 30, when the insertion member 56 is inserted into the insertion hole 55*b* of the second base part 53 and the insertion hole 35*b* of the other one of the restraint members 30, the second base part 53 and the other restraint member 30 are fixed. Due to this, the second unit 200 is attached to the first unit 100.

When the first base part 52 and the second base part 53 are fixed to the pair of restraint members 30 and 30 via the fixing part 55 described above, the flow channel part 60 is liquid-tightly connected to the opening 20*b* of the electrode laminate 10. In the present embodiment, when the second unit 200 is attached to the first unit 100, and the first connection part 63 is pressed against the electrode laminate 10 by the elastic part 67, the flow channels 63*a* of the first connection part 63 are liquid-tightly connected to the respective openings 20*b*, and the openings 20*b* of the electrode laminate 10 communicate with the respective flow channels 61*a*, 62*a*, and 63*a* formed in the flow channel part 60.

The first unit 100 and the second unit 200 are configured to be able to relatively move the second unit 200 to an attachment position of the first unit 100 (a position where the insertion member 56 can be inserted into both of the insertion hole 55*b* of the first base part 52 and the insertion hole 35*b* of one of the restraint members 30, and where the insertion member 56 can be inserted into both of the insertion hole 55*b* of the second base part 53 and the insertion hole 35*b* of the other one of the restraint members 30).

Specifically, the first unit 100 and the second unit 200 are configured so that, when the second unit 200 is attached to the first unit 100, the fixing part 35 formed on one of the restraint members 30 and the fixing part 35 formed on the other one of the restraint members 30 are disposed between the fixing part 55 formed on the first base part 52 and the fixing part 55 formed on the second base part 53 in the Z-axis direction. The second unit 200 is disposed to be able to be slid and moved in the Y-axis direction to the attachment position with respect to the first unit 100. In the present embodiment, the first unit 100 and the second unit 200 are disposed to be able to be slid and moved also in the X-axis direction.

Next, the following describes a procedure of removing the second unit 200 from the first unit 100. When the insertion member 56 is extracted from the insertion hole 55*b* of the first base part 52 and the insertion hole 35*b* of the one of the restraint members 30, and the insertion member 56 is extracted from the insertion hole 55*b* of the second base part 53 and the insertion hole 35*b* of the other one of the restraint members 30, the first base part 52 is separated from the one restraint member 30, and the second base part 53 is separated from the other restraint member 30. Due to this, the second unit 200 is separated from the first unit 100.

Returning to the description of the second unit 200, as illustrated in FIG. 8, the connection member 70 is a portion to which the connected part 110 is coupled from a vertically upward direction. The connection member 70 is disposed, in the extending direction of the main body pipe 61, at an end part on the opposite side of an end part at which the nozzle 62 is attached to the main body pipe 61. In the connection member 70, a plurality of the flow channels 71 in which a medium circulates are formed, the flow channels 71 communicating with the respective flow channels 61*a* of the main body pipe 61. The flow channel 71 includes a bending part 71*a* bending from the extending direction (X-axis direction) of the flow channel 61*a* toward a vertically upward direction (positive side of the Z-axis direction) between one end communicating with the flow channel 61*a* and the other end on the opposite side of the one end.

A portion of the flow channel 71 between the bending part 71*a* and the other end extends along a vertically upward direction. At the other end of each of the flow channels 71, a plurality of the second connection parts 72 having a projecting shape formed on the connection member 70 are disposed. The second connection parts 72 are arranged along the X-axis direction. Each connecting portion between the second connection part 72 and the connected part 110 is positioned on a vertically upper side than each of the openings 20*b* communicating therewith via the flow channels 61*a*, 62*a*, 63*a*, and 71. Each of the second connection parts 72 is positioned on a vertically upper side than each of the spaces S communicating therewith via the flow channels 61*a*, 62*a*, 63*a*, and 71 and the openings 20*b*.

An example of the connected part 110 is the distal end part 113 of the supply pipe 120 through which the electrolytic solution 19 is supplied. For example, at the supplying step S5, the supply pipe 120 is coupled to the connection member 70. The supply pipe 120 is coupled to the connection member 70 by fitting the second connection part 72 into a recessed part 112 formed at the distal end part 113 of the supply pipe 120. At the distal end part 113, a guide part 114 is formed for facilitating coupling between the second connection part 72 and the distal end part 113. The guide part 114 guides the second connection part 72 to the recessed part 112 of the distal end part 113.

Figure 10:
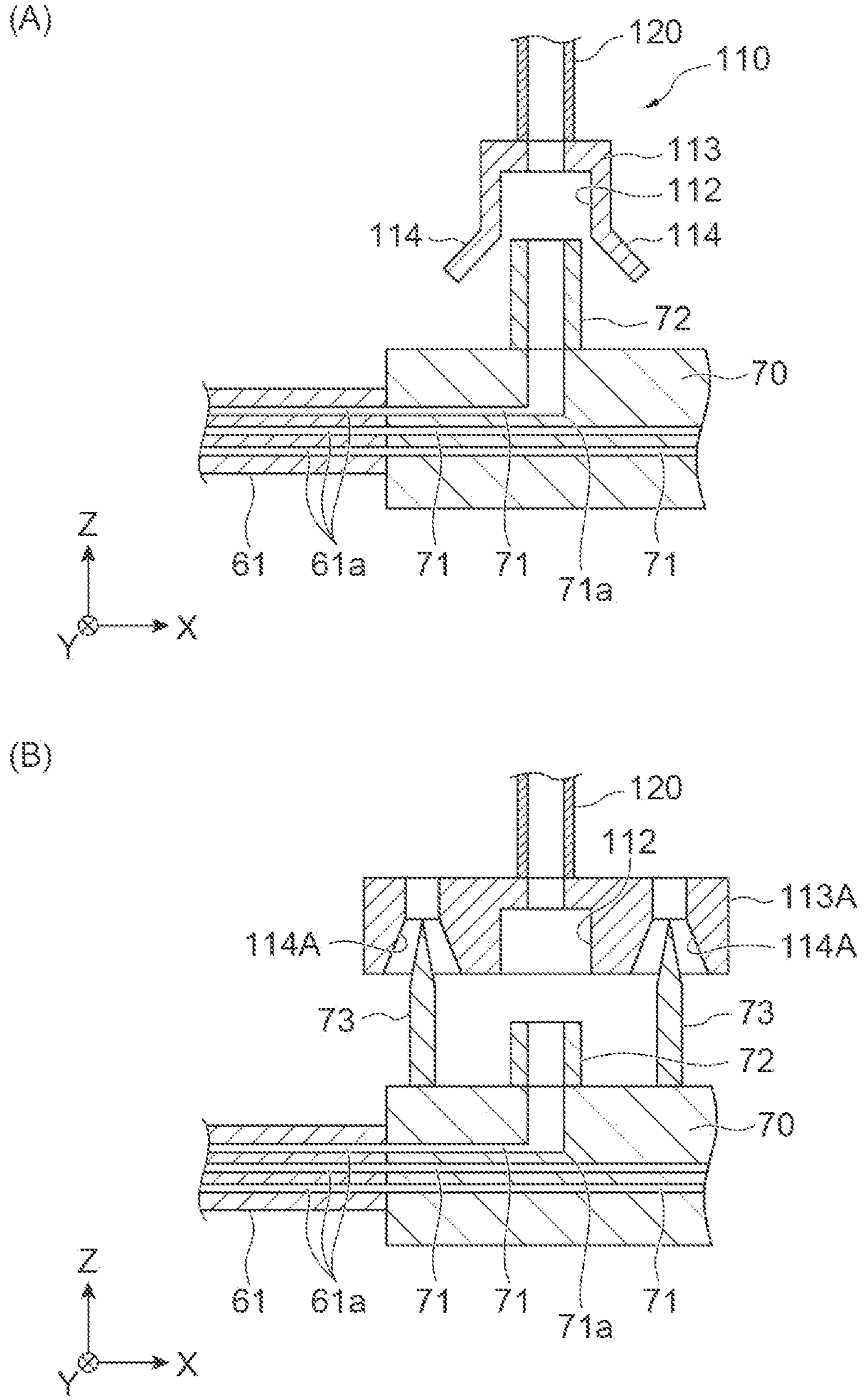
FIG. 10(A) is a cross-sectional view of an example of a connection member viewed from the Y-axis direction.
FIG. 10(B) is a cross-sectional view of another example of the connection member viewed from the Y-axis direction.

The configuration for facilitating coupling between the distal end part 113 and the second connection part 72 is not limited to the configuration described above. For example, as illustrated in FIG. 10(B), a configuration of guiding a rod-shaped guided part 73 formed on the connection member 70 by a guide part 114A formed at a distal end part 113A may be used. Even with this configuration, the second connection part 72 can be indirectly guided to the recessed part 112 of the distal end part 113A by guiding the guided part 73 to the guide part 114A.

As described above, the first unit 100 in the present embodiment can restrain, by being attached to the electrode laminate 10, the electrode laminate 10 in a state of applying a predetermined load in the Z-axis direction. The second unit 200 in the present embodiment can connect the flow channel part 60 to the opening 20*b* of the electrode laminate 10 by being attached to the first unit 100.

The following describes working effects of the method for manufacturing the power storage module 1. In the method for manufacturing the power storage module 1 in the embodiment described above, the opening 20*b* of the electrode laminate 10, which is placed on one of the restraint members 30 so that the Z-axis direction runs along the vertical direction, opens in a direction along the horizontal direction. In the electrode laminate 10 to which the electrolytic solution 19 is supplied through the opening 20*b* opened in the direction along the horizontal direction as described above, the possibility that the electrolytic solution 19 leaks out from the opening 20*b* becomes high. From this point of view, in the method for manufacturing the power storage module 1 in the embodiment described above, the laminate is conveyed to a place where the next step is performed without removing the second unit 200 in which the connecting portion with respect to the connected part 110 of the second connection part 72 is positioned on the upper side in the vertical direction than the opening 20*b* even after the supplying step S5, so that the electrolytic solution 19 can be prevented from leaking out from the electrode laminate 10 during conveyance. As a result, a series of manufacturing steps can be performed while maintaining the electrode laminate 10 after the electrolytic solution 19 is injected in the state in which the electrode laminate 10 is laminated in the vertical direction, and preventing the electrolytic solution 19 from leaking out from the opening 20*b*.

In the method for manufacturing the power storage module 1 in the embodiment described above, at the connecting step S4, the first connection part 63 is biased with respect to the electrode laminate 10, so that the second unit 200 can be more liquid-tightly connected to the opening 20*b* of the electrode laminate 10.

The method for manufacturing the power storage module 1 in the embodiment described above includes a restraining step S3 of attaching, to the electrode laminate 10, the restraint members 30 and 30 configured to restrain the electrode laminate 10 in the Z-axis direction with a predetermined pressure before the supplying step S5. Due to this, it is possible to prevent a situation in which the current collector 15 in the vicinity of the opening 20*b* is deformed (swells in the Z-axis direction) at the time of supplying the electrolytic solution 19, the electrolytic solution 19 stays in the vicinity of the opening 20*b*, and the electrolytic solution 19 is not supplied to the inside of the space S.

In the method for manufacturing the power storage module 1 in the embodiment described above, at the restraining step S3, the restraint members 30 and 30 are attached to the electrode laminate 10 so that one of the side surfaces 30*e* of the restraint members 30 and 30 is flush with the side surface 20*a* of the electrode laminate 10 on which the opening 20*b* is formed. Due to this, a member such as the second unit 200 connected to the opening 20*b*, for example, can be prevented from interfering with the restraint members 30 and 30, and workability at the time of attaching the second unit 200 to the opening 20*b* can be improved.

In the method for manufacturing the power storage module 1 in the embodiment described above, the first unit 100 and the second unit 200 are configured to be able to be attached or detached to/from each other, and the first connection part 63 is connected to the opening 20*b* of the electrode laminate 10 by attaching the second unit 200 to the first unit 100 at the connecting step S4. Due to this, the first connection part 63 is connected to the opening 20*b* by performing simple work of attaching the second unit 200 to the first unit 100, so that workability at the time of attaching the first connection part 63 to the opening 20*b* can be improved.

At the activating step S7 in the method for manufacturing the power storage module 1 in the embodiment described above, gas discharged from the space S due to the activation is discharged via the connection member 70. Due to this, the laminate can be easily connected to an exhaust facility, so that workability at the activating step can be improved.

At the activating step in the method for manufacturing the power storage module 1 in the embodiment described above, a gas bag serving as the connected part 110 may be connected to the connection member 70. In this method, gas exhausted at the activating step can be collected by simple preparing work without connection to a large-scale facility.

At the sealing step in the method for manufacturing the power storage module 1 in the embodiment described above, after changing the posture of the electrode laminate 10 so that the opening 20*b* of the electrode laminate 10 is oriented in the vertically upward direction, the second unit 200 is removed from the opening 20*b*, and the opening 20*b* is sealed. Due to this, when the opening 20*b* is sealed, the posture of the electrode laminate 10 is changed so that the opening 20*b* is oriented upward, so that the electrolytic solution 19 can be prevented from leaking out from the opening 20*b* at the time of removing the second unit 200.

The embodiment has been described above, but an aspect of the present invention is not limited to the embodiment described above. Various modifications can be made without departing from the gist of the invention.

First Modification

Figure 11:
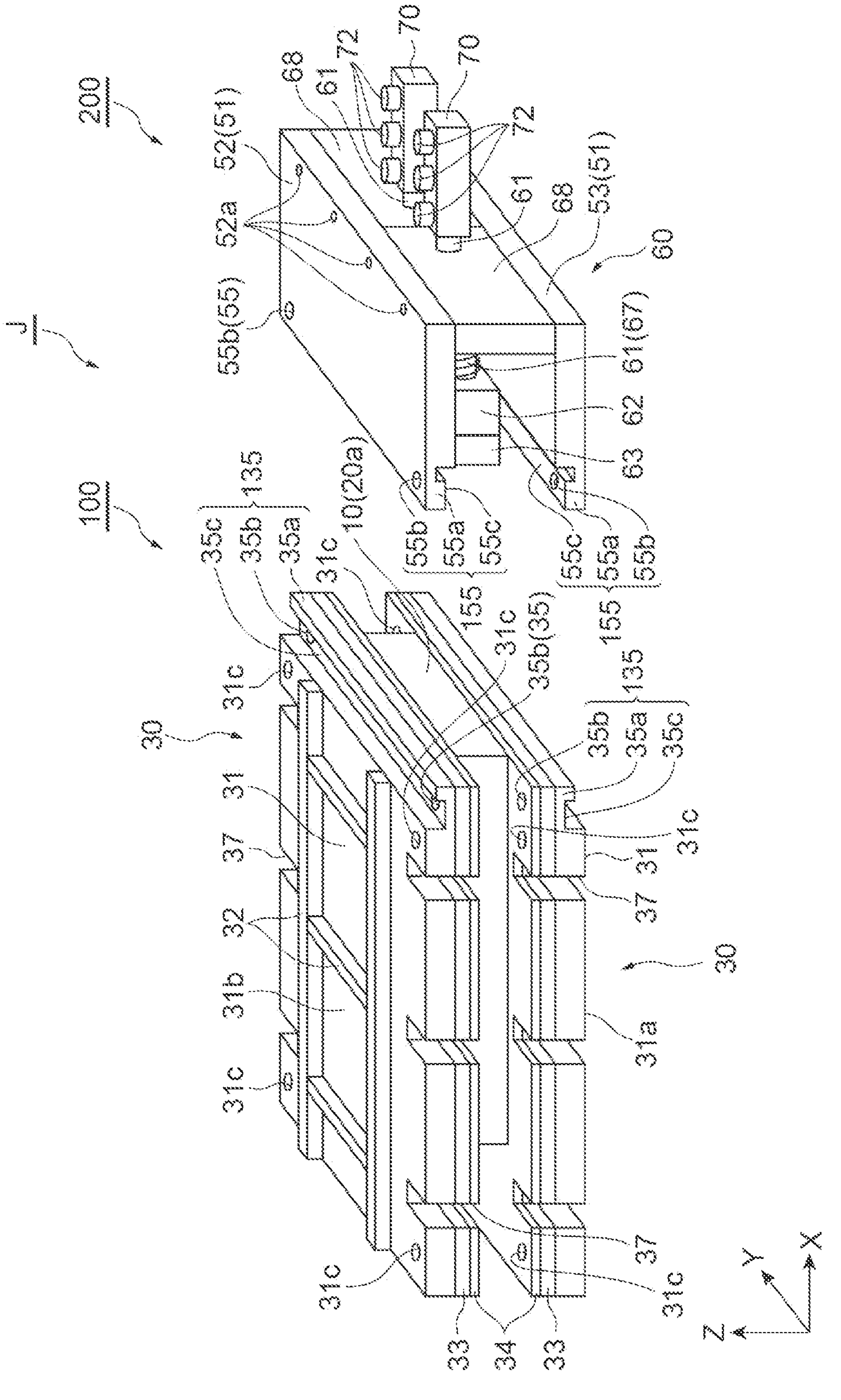
FIG. 11 is a perspective view illustrating a first unit according to a first modification and a second unit according to the first modification in a state in which the pair of regulation members is removed.

A configuration of a fixing part 135 illustrated in FIG. 11 may be used instead of the configuration of the fixing part 35 of the first unit 100 in the embodiment described above, and a configuration of a fixing part 155 illustrated in FIG. 11 may be used instead of the configuration of the fixing part 55 of the second unit 200 in the embodiment described above. Specifically, the fixing part 135 of the first unit 100 includes the overhang parts 35*a* and 35*a* projecting in the X-axis direction as the attaching and detaching direction of the pair of restraint members 30 and 30, the insertion holes 35*b* and 35*b* formed on the respective overhang parts 35*a* and 35*a*, and recessed parts 35*c* and 35*c* formed on the respective overhang parts 35*a* and 35*a*. The fixing part 155 of the second unit 200 includes overhang parts 55*a* and 55*a* projecting in the X-axis direction as the attaching and detaching direction of a pair of the base parts 51 and 51, insertion holes 55*b* and 55*b* formed on the respective overhang parts 55*a* and 55*a*, and projecting parts 55*c* and 55*c* formed on the respective overhang parts 55*a* and 55*a*. The recessed parts 35*c* and 35*c* and the projecting parts 55*c* and 55*c* respectively extend along the Y-axis direction. The recessed parts 35*c* and 35*c* are formed from one end to the other end in the Y-axis direction of the overhang parts 35*a* and 35*a*. The projecting parts 55*c* and 55*c* are formed from one end to the other end in the Y-axis direction of the overhang parts 55*a* and 55*a*.

With the configurations of the first unit 100 and the second unit 200 according to the first modification, movement of the second unit 200 in the X-axis direction with respect to the first unit 100 can be regulated by simple work of fitting the projecting part 55*c* formed on the fixing part 155 of the second unit 200 into the recessed part 35*c* formed on the fixing part 135 of the first unit 100. Unlike the second unit 200 in the embodiment described above, the second unit 200 in the first modification is attached or detached by being slid and moved along the Y-axis direction to the attachment position with respect to the first unit 100. In attaching or detaching the second unit 200 in the first modification to/from the first unit 100, the second unit 200 is slid and moved along the Y-axis direction in a state in which the first connection part 63 (nozzle 62) is compressed in the X-axis direction so that the first connection part 63 does not project from the first base part 52 and the second base part 53 in the X-axis direction when viewed from the Z-axis direction. When the insertion member 56 is inserted into the insertion holes 35*b* and 55*b*, movement in the Y-axis direction of the second unit 200 with respect to the first unit 100 is regulated.

Second Modification

Figure 13:
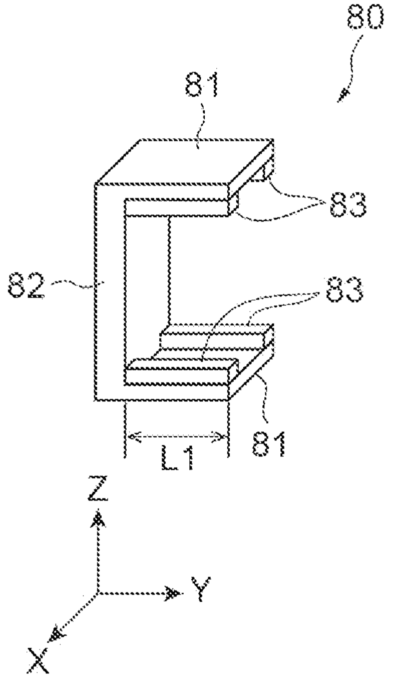
FIG. 13(A) is a perspective view illustrating the connection piece according to the second modification.
FIG. 13(B) is a side view of the first unit according to the second modification and the second unit according to the second modification in a state in which the pair of regulation members and the connection piece are attached viewed from the Y-axis direction.
Figure 13:
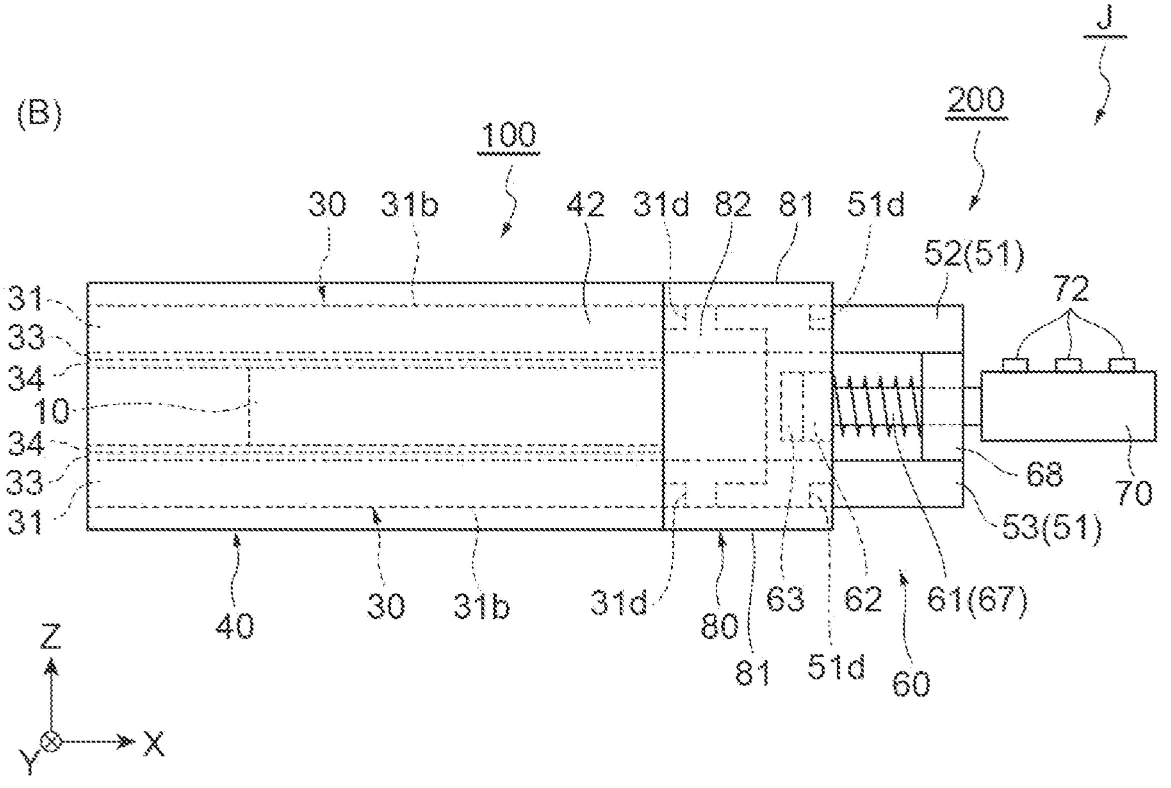

In the embodiment and the modification described above, described is the example in which the first unit 100 and the second unit 200 are fixed to each other via the fixing part 35 formed on the first unit 100 and the fixing part 55 formed on the second unit 200, but they may be fixed to each other via a connection piece 80 as illustrated in FIG. 13(A), for example. The connection piece 80 includes a pair of plate-shaped first portions 81 and 81 opposed to each other, a plate-shaped second portion 82 connecting the first portions 81 and 81, and a pair of projecting parts 83 and 83 projecting from each of the first portions 81 and 81 in an opposing direction (Z-axis direction) of the first portions 81 and 81. The following describes specific configurations of the first unit 100 and the second unit 200 configured to be connected by using the connection piece 80 as described above.

Figure 12:
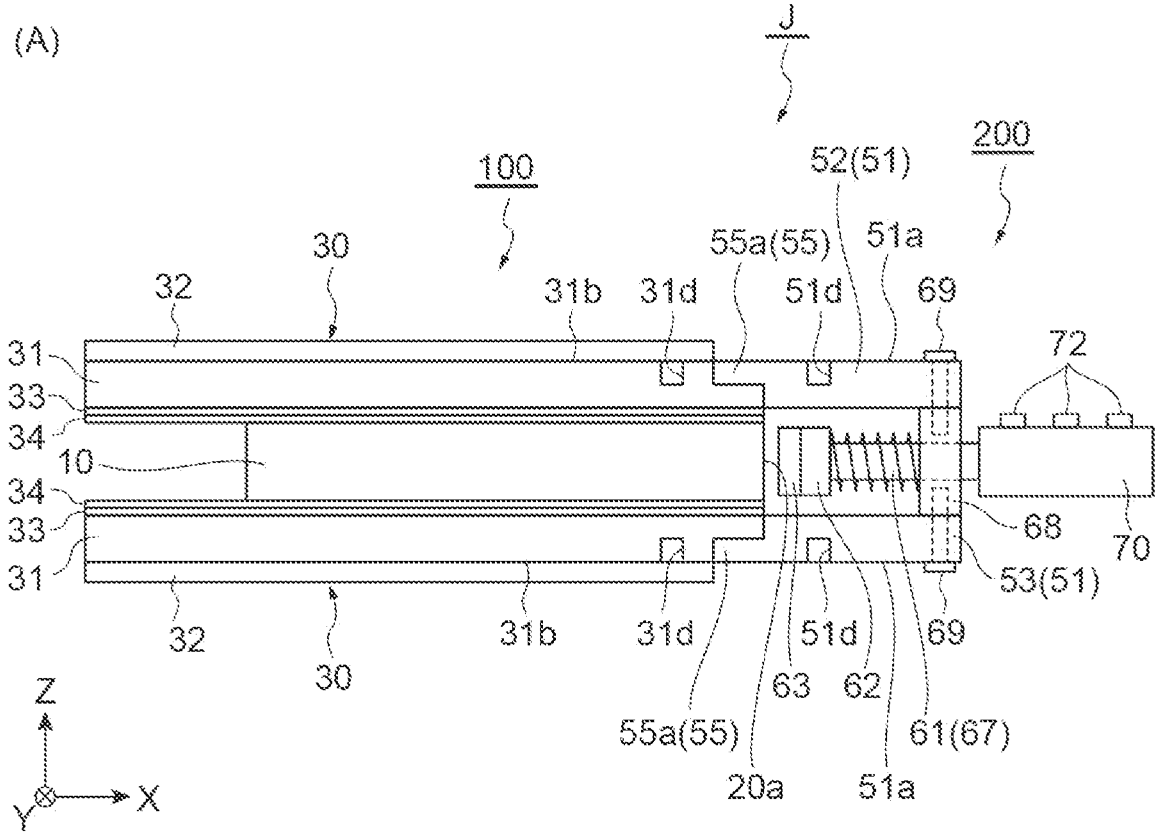
FIG. 12(A) is a side view of a first unit according to a second modification and a second unit according to the second modification in a state in which the pair of regulation members is removed viewed from the Y-axis direction.
FIG. 12(B) is a top view of a recessed part into which a connection piece according to the second modification is fitted viewed from the Z-axis direction.
Figure 12:
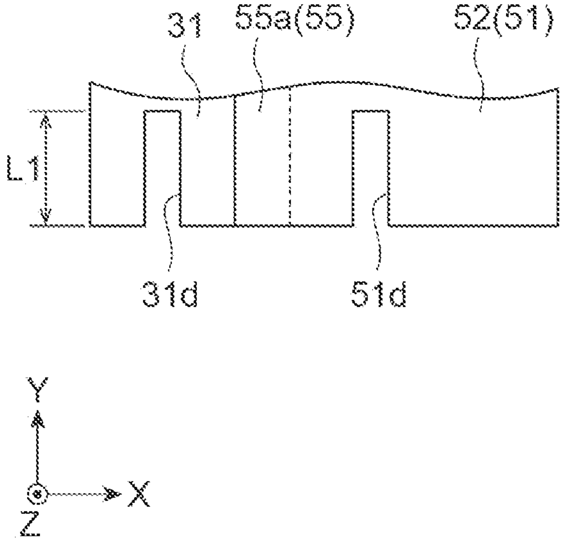

Regarding the first unit 100 illustrated in FIG. 12(A), the regulation member 40 is not illustrated for convenience of explanation. On each of the pair of restraint members 30 and 30 constituting the first unit 100, a recessed part 31*d* into which the projecting part 83 of the connection piece 80 can be fitted is formed. More specifically, the recessed part 31*d* is formed on the outer surface 31*b* of the main body part 31 of each of the pair of restraint members 30 and 30. On each of the pair of base parts 51 and 51 constituting the second unit 200, a recessed part 51*d* into which the projecting part 83 of the connection piece 80 can be fitted is formed. More specifically, the recessed part 51*d* is formed on an outer surface 51*a* of each of the pair of base parts 51 and 51. As illustrated in FIG. 12(B), a size L1 in the Y-axis direction of the recessed parts 31*d* and 51*d* is formed to be substantially equal to the size L1 in the Y-axis direction of the projecting part 83 illustrated in FIG. 13(A).

As illustrated in FIG. 13(B), the second unit 200 is attached to the first unit 100 by arranging the first unit 100 and the second unit 200 on which the recessed parts 31*d* and 51*d* are respectively formed in the X-axis direction, and attaching the connection piece 80 thereto from the Y-axis direction so that the projecting parts 83 and 83 are respectively inserted into the recessed parts 31*d* and 51*d* of the first unit 100 and the second unit 200. In the first unit 100 in the second modification, the regulation member 40 is formed to have a size in the X-axis direction shorter than that in the embodiment described above. Due to this, the connection piece 80 attached by the method described above and the regulation member 40 are arranged side by side in the X-axis direction without interfering with each other. At this point, it is preferable that the second portion 82 of the connection piece 80 and the connection part 42 of the regulation member 40 are flush with each other (in a state without a level difference) in the Y-axis direction.

In the first unit 100 and the second unit 200 according to the second modification, the insertion holes 35*b* and 55*b* may be disposed on the fixing parts 35 and 55 and the insertion member 56 may be inserted through the insertion holes 35*b* and 55*b* similarly to the embodiment and the first modification described above, or the insertion holes 35*b* and 55*b* may be omitted from the fixing parts 35 and 55. Alternatively, a projection part may be formed instead of the recessed part 31*d* formed on the restraint member 30, a projection part may be formed instead of the recessed part 51*d* formed on the base part 51, and the connection piece 80 on which recessed parts are formed to be able to fit with the projection parts may be used to fix the second unit 200 to the first unit 100.

Third Modification

Figure 14:
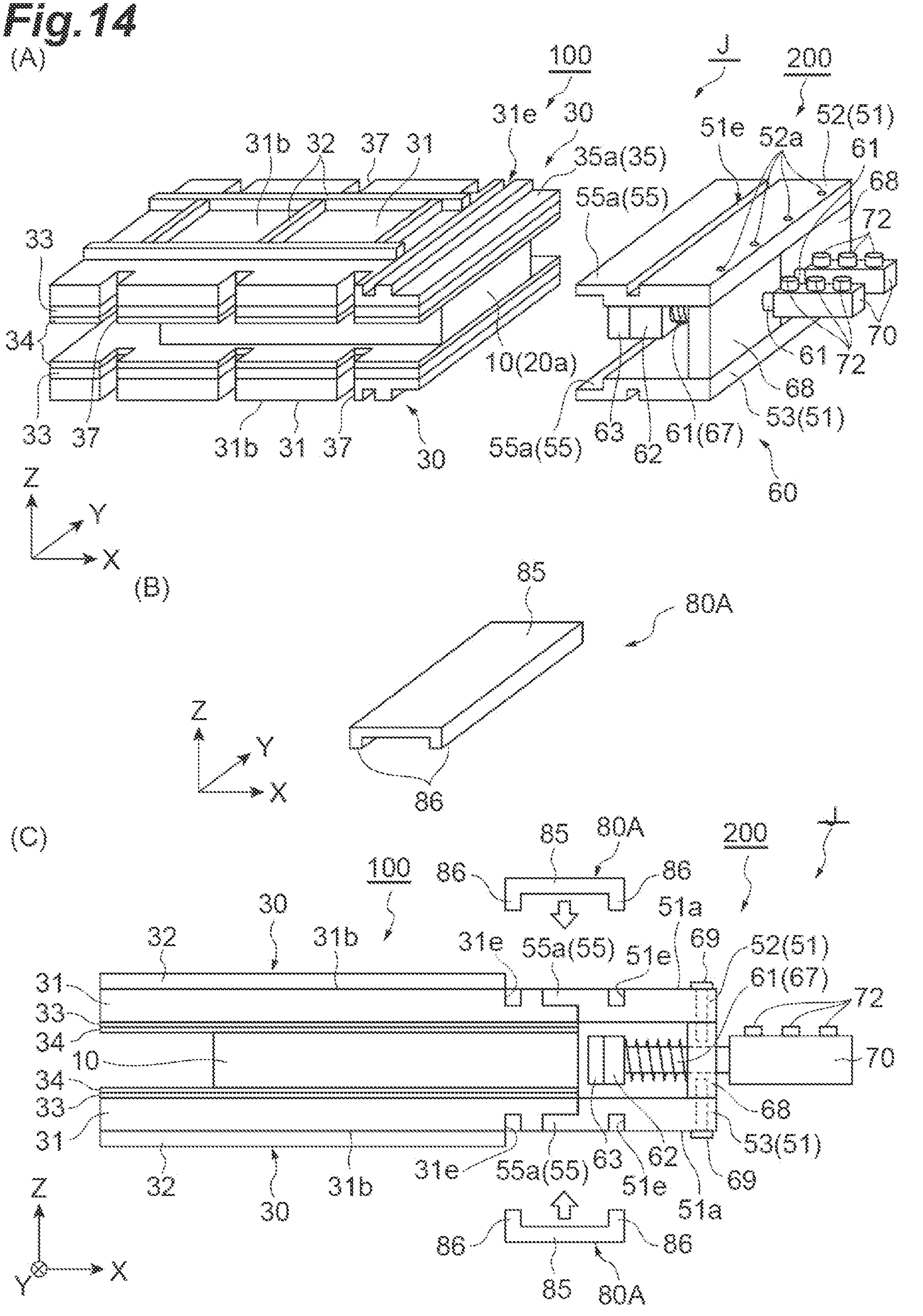
FIG. 14(A) is a side view of a first unit according to a third modification and a second unit according to the third modification in a state in which the pair of regulation members is removed viewed from the Y-axis direction.
FIG. 14(B) is a perspective view illustrating a connection piece according to the third modification.
FIG. 14(C) is a diagram illustrating a method for attaching the connection piece according to the third modification to the first unit and the second unit according to the third modification in a state in which the pair of regulation members is removed.
Figure 15:
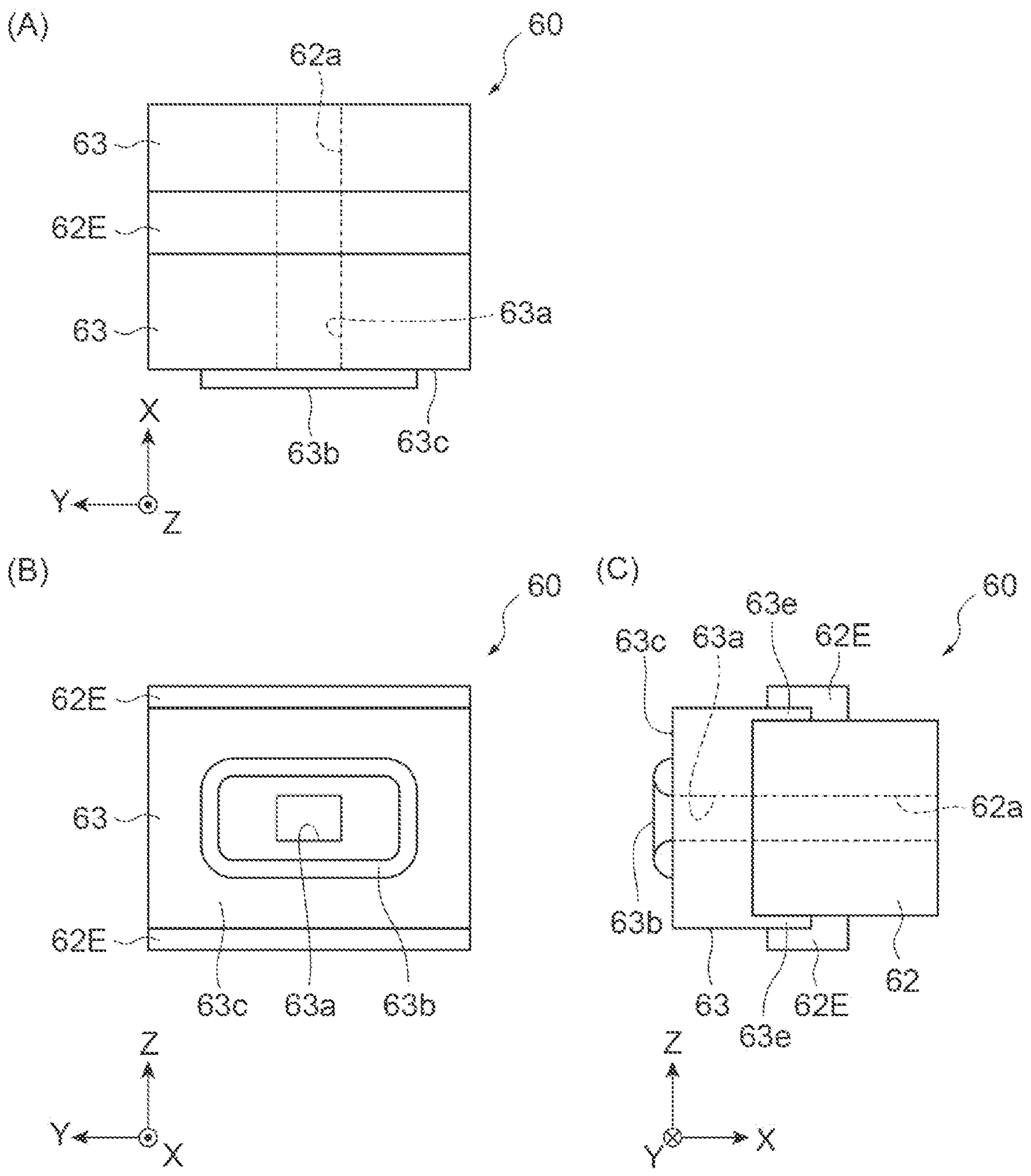
FIG. 15(A) is a top view of a first connection part and a nozzle according to a fourth modification viewed from the Z-axis direction.
FIG. 15(B) is a front view of the first connection part according to the fourth modification viewed from the X-axis direction.
FIG. 15(C) is a side view of the first connection part and the nozzle according to the fourth modification viewed from the Y-axis direction.

Similarly to the second modification described above, the second unit 200 may be attached to the first unit 100 by using a connection piece 80A as illustrated in FIG. 14(B). The connection piece 80A is different from the connection piece 80 according to the second modification in that the connection piece 80A includes a main body plate 85 having a plate shape, and a pair of projecting parts 86 and 86 projecting from the main body plate 85.

As illustrated in FIG. 14(A) and FIG. 14(C), in the first unit 100 and the second unit 200, a recessed part 31*e* extending in the Y-axis direction is formed on the outer surface 31*b* of the main body part 31 of each of the pair of restraint members 30 and 30, and a recessed part 51*e* extending in the Y-axis direction is formed on the outer surface 51*a* of each of the pair of base parts 51 and 51 in addition to the configurations described in the above embodiment. These recessed parts 31*e* and 51*e* are formed so that the projecting parts 86 of the connection piece 80A can be fitted into them. More specifically, the depth of the recessed part 31*e* with respect to the outer surface 31*b* and the depth of the recessed part 51*e* with respect to an outer surface 51*a* are substantially equal to the height of the projecting part 86 in the Z-axis direction.

As illustrated in FIG. 14(C), the second unit 200 is attached to the first unit 100 by arranging the first unit 100 and the second unit 200 on which the recessed parts 31*e* and 51*e* are respectively formed in the X-axis direction, and attaching the connection piece 80A thereto from the Z-axis direction so that the projecting parts 86 and 86 are respectively inserted into the recessed parts 31*e* and 51*e* of the first unit 100 and the second unit 200. In the third modification, the size in the X-axis direction of the regulation member 40 and the size in the X-axis direction of the connection piece 80A are appropriately adjusted so that the connection piece 80A and the regulation member 40 do not interfere with each other when the connection piece 80A is attached to the first unit 100 and the second unit 200. Alternatively, a projection part may be formed instead of the recessed part 31*e* formed on the restraint member 30, a projection part may be formed instead of the recessed part 51*e* formed on the base part 51, and the connection piece 80A on which recessed parts are formed to be able to fit with the projection parts may be used to fix the second unit 200 to the first unit 100.

Fourth Modification

In the above description, described is the example in which a distal end surface 63*c* of the first connection part 63 of the second unit 200 according to the embodiment and the modification described above is formed to be flat as illustrated in FIG. 9, and the frame part 20*c* (frame part coupling body 20*d*) is formed on the side surface 20*a* of the electrode laminate 10, but the embodiment is not limited thereto. As illustrated in FIG. 15(A), FIG. 15(B), FIG. 15(C), and FIG. 16(A), for example, a projecting part 63*b* projecting to surround the flow channel 63*a* may be formed on the distal end surface 63*c* of the first connection part 63, and the frame part 20*c* (frame part coupling body 20*d*) is not necessarily formed on the side surface 20*a* of the electrode laminate 10. For example, a cross-sectional shape of a distal end of the projecting part 63*b* is formed to be a semicircular shape. In this way, with the configuration in which the projecting part 63*b* is formed on the first connection part 63, adhesion between the first connection part 63 and the electrode laminate 10 can be enhanced even if the frame part 20*c* (frame part coupling body 20*d*) is not formed on the side surface 20*a* of the electrode laminate 10.

Figure 16:
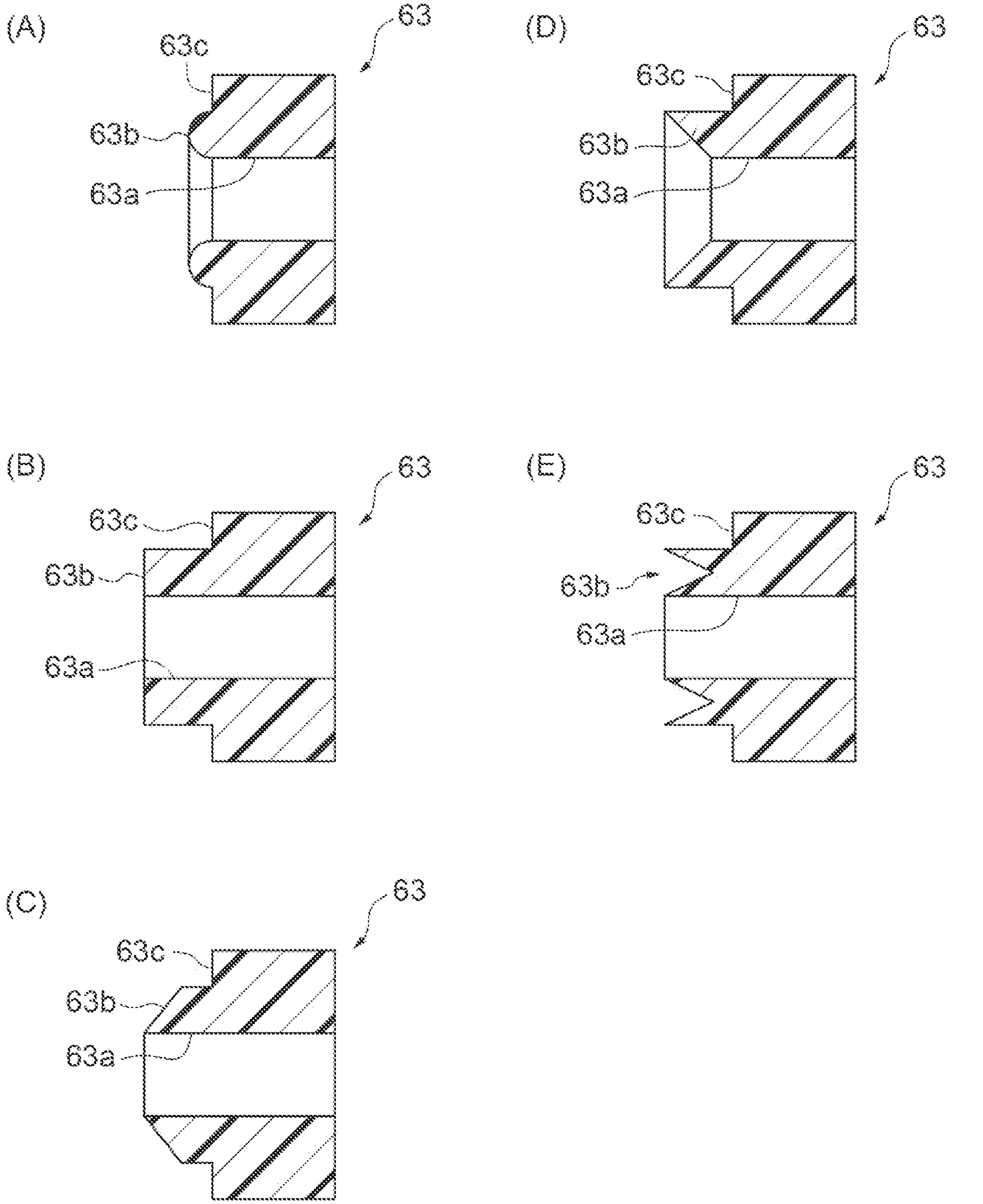
FIG. 16 Each of FIG. 16(A) to FIG. 16(E) is a cross-sectional view illustrating an example of a shape of a projecting part of the first connection part according to the fourth modification.

The cross-sectional shape of the distal end of the projecting part 63*b* is not limited to the semicircular shape as illustrated in FIG. 16(A), but may be formed to be an angular shape as illustrated in FIG. 16(B), a tapered shape as illustrated in FIG. 16(C) and FIG. 16(D), or an M-shape as illustrated in FIG. 16(E).

Fifth Modification

Figure 17:
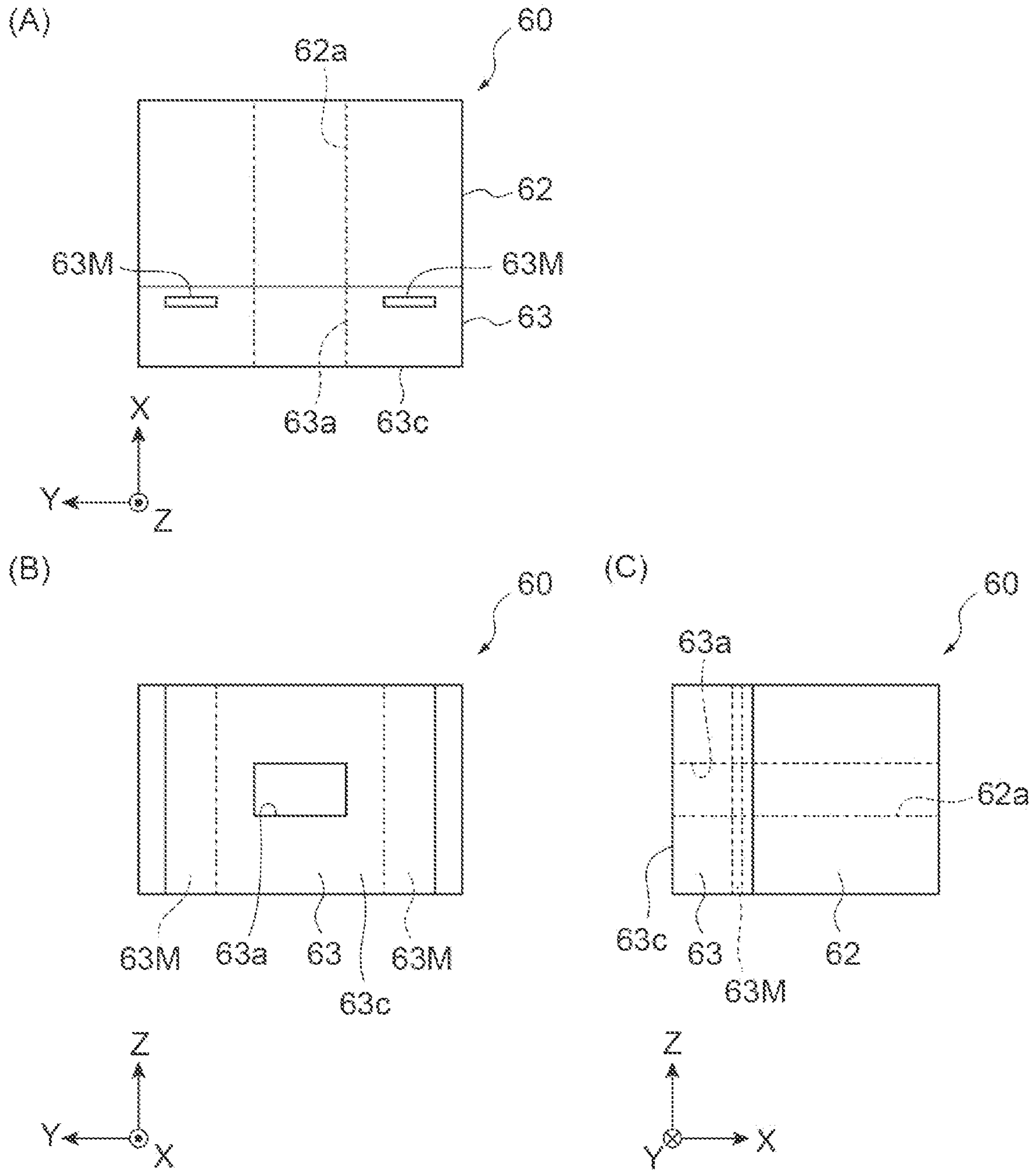
FIG. 17(A) is a top view of a first connection part and a nozzle according to a fifth modification viewed from the Z-axis direction.
FIG. 17(B) is a front view of the first connection part according to the fifth modification viewed from the X-axis direction.
FIG. 17(C) is a side view of the first connection part and the nozzle according to the fifth modification viewed from the Y-axis direction.

Regarding the second unit 200 in the embodiment and the modification described above, described is the example in which the first connection part 63 is attached to the nozzle 62 by the grasping part 62E, but the embodiment is not limited thereto. For example, as illustrated in FIG. 17(A) to FIG. 17(C), by employing the first connection part 63 in which belt-shaped magnets 63M and 63M are embedded in the vicinity of both end parts in the Y-axis direction, the first connection part 63 may be fixed to the nozzle 62 made of stainless steel and having magnetism. In this configuration, the grasping part 62E is not required to be disposed on the outer peripheral surface of the nozzle 62, so that the size of the flow channel part 60 can be reduced. Due to this, even in a case in which the number of the openings 20*b* on the electrode laminate 10 is increased and the flow channel parts 60 are increased corresponding to the number thereof, interference between the flow channel parts 60 can be suppressed.

Figure 18:
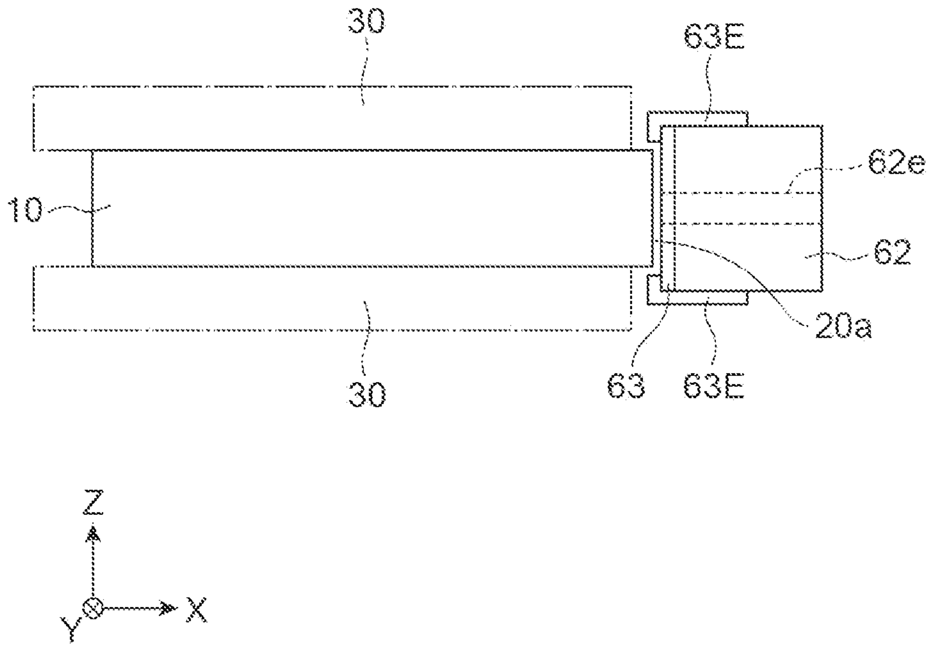
FIG. 18 is a side view of the first connection part and the nozzle according to the fifth modification viewed from the Y-axis direction.

As illustrated in FIG. 18, even in a case of disposing the grasping part 62E of the first connection part 63 similarly to the embodiment described above, the grasping part 62E may be projected from the distal end of the nozzle 62 toward a side on which the electrode laminate 10 is disposed to grasp both ends in the Z-axis direction of the first connection part 63. In this case, the first unit 100 is attached to the electrode laminate 10 so that the side surfaces 30*e* on the second unit 200 side in the X-axis direction of the pair of restraint members 30 and 30 are retracted rearward from the side surface 20*a* of the electrode laminate 10 on which the opening 20*b* is formed. That is, in the first unit 100, a relief portion is formed for the grasping part 62E when the first connection part 63 is pressed against the side surface 20*a* of the electrode laminate 10. With this configuration, the first connection part 63 is not required to be formed to have a shape capable of being attached to the nozzle 62 by the grasping part 62E, and the shape can be simplified, so that processing cost for the first connection part 63 can be reduced.

Sixth Modification

Figure 19:
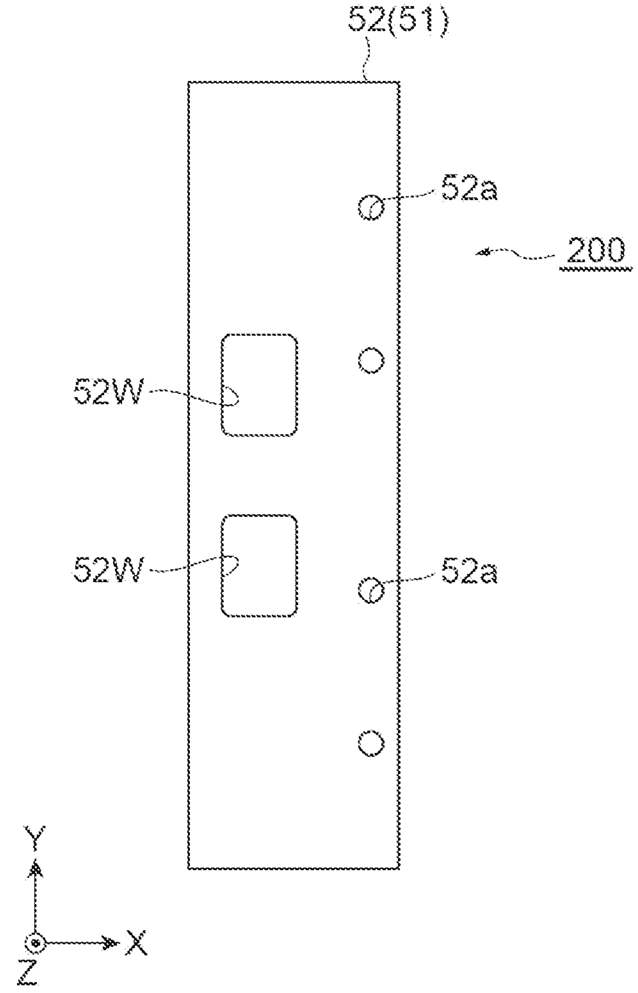
FIG. 19(A) is a top view of a first base part according to a sixth modification on which a confirmation window is formed viewed from the Z-axis direction.
FIG. 19(B) is an enlarged view of the confirmation window viewed from the Z-axis direction.
Figure 19:
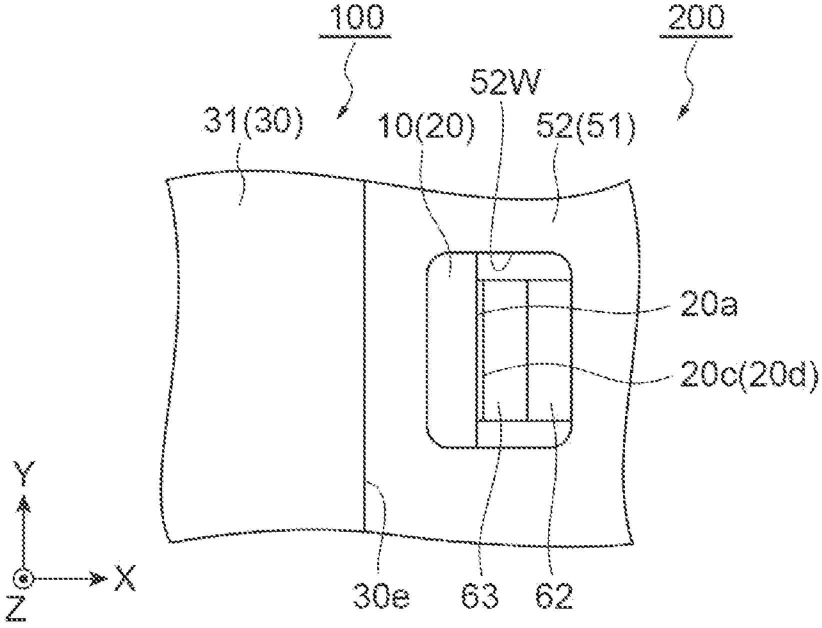

In addition to the configuration of the first base part 52 of the second unit 200 according to the embodiment and the modification described above, confirmation windows 52W may be formed as illustrated in FIG. 19(A). Each confirmation window 52W is an opening portion that is disposed to visually recognize, from the Z-axis direction, a connection state between the first connection part 63 and the frame part coupling body 20*d* (opening 20*b*) of the electrode laminate

10 when the second unit 200 is attached to the first unit 100. Thus, the confirmation windows 52W are formed so that the number thereof corresponds to the number of the frame part coupling bodies 20*d*. The operator can visually recognize a connecting portion between the first connection part 63 and the frame part coupling body 20*d* by viewing the confirmation window 52W from the Z-axis direction.

A position where the confirmation window 52W is formed is determined in accordance with how the first unit 100 (pair of restraint members 30 and 30) holds the electrode laminate 10. More specifically, a forming position of the confirmation window 52W is set based on a positional relation between the side surface 20*a* of the electrode laminate 10 in the X-axis direction (the side surface 20*a* on which the opening 20*b* is formed) and the side surface 30*e* of the restraint member 30 in the X-axis direction. The position of the confirmation window 52W illustrated in FIG. 19(B) is an example corresponding to a case assuming that the first unit 100 holds the electrode laminate 10 so that the frame part coupling body 20*d* of the electrode laminate 10 projects from the side surface 30*e* of the restraint member 30 in the X-axis direction.

Figure 20:
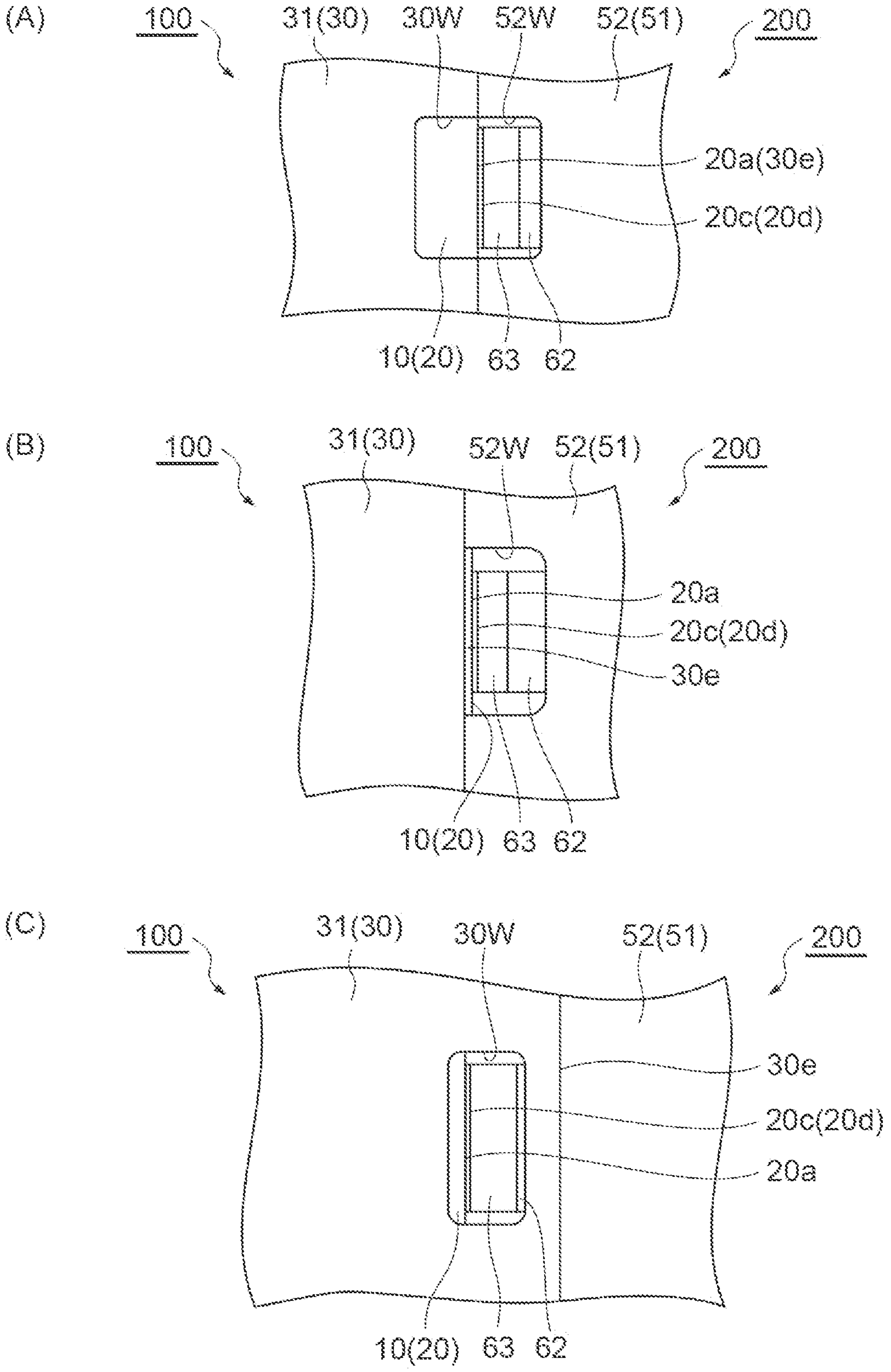
FIG. 20(A) to FIG. 20(C) are enlarged views of the confirmation window viewed from the Z-axis direction.

In FIG. 20(A), a confirmation window 30W having a notch shape is formed on one of the restraint members 30, and the confirmation window 52W having a notch shape is formed on the first base part 52. The confirmation window 30W and the confirmation window 52W form one opened confirmation window by being combined with each other. The positions of the confirmation window 30W and the confirmation window 52W illustrated in FIG. 20(A) are examples corresponding to a case assuming that the first unit 100 holds the electrode laminate 10 so that the frame part coupling body 20*d* of the electrode laminate 10 slightly projects from the side surface 30*e* of the restraint member 30 in the X-axis direction, or the first unit 100 holds the electrode laminate 10 so that the frame part coupling body 20*d* of the electrode laminate 10 is flush with the side surface 30*e* of the restraint member 30 in the X-axis direction.

In FIG. 20(B), the confirmation window 52W having a notch shape is formed on the first base part 52. The position of the confirmation window 52W illustrated in FIG. 20(B) is also an example corresponding to a case assuming that the first unit 100 holds the electrode laminate 10 so that the frame part coupling body 20*d* of the electrode laminate 10 projects from the side surface 30*e* of the restraint member 30 in the X-axis direction. In FIG. 20(C), an opening serving as the confirmation window 30W is formed on the restraint member 30. The position of the confirmation window 30W illustrated in FIG. 20(C) is an example corresponding to a case assuming that the first unit 100 holds the electrode laminate 10 so that the frame part coupling body 20*d* of the electrode laminate 10 is retracted from the side surface 30*e* of the restraint member 30 in the X-axis direction.

In the example described above, any of the confirmation windows 30W and 52W in FIG. 19(A), FIG. 20(A), FIG. 20(B), and FIG. 20(C) is formed to have a size with which the entire first connection part 63 in the Y-axis direction can be visually recognized when viewed from the Z-axis direction, but a confirmation window having a size with which both end parts of the first connection part 63 in the Y-axis direction can be at least confirmed may be disposed, for example. With such a configuration of the confirmation window, a restraint area of the restraint member 30 and/or the first base part 52 with respect to the electrode laminate 10 can be increased.

Seventh Modification

Figure 21:
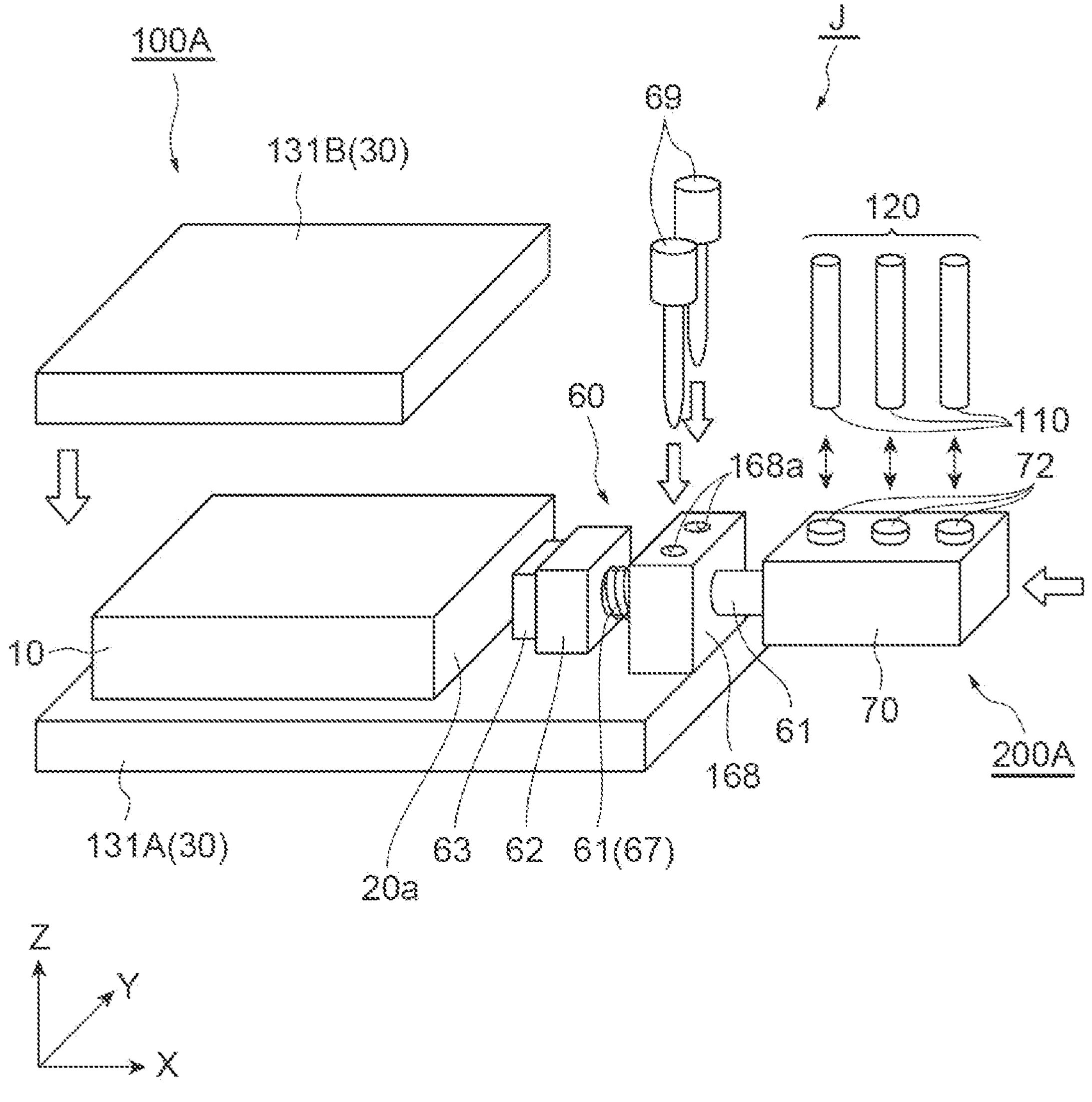
FIG. 21 is a perspective view illustrating a first unit and a second unit according to a seventh modification.

In place of the first unit 100 and the second unit 200 in the embodiment described above, a first unit 100A and a second unit (flow channel unit) 200A as illustrated in FIG. 21 may be used. The first unit 100A according to the seventh modification is different from the first unit 100 according to the embodiment and the modifications described above in that a restraint member 131A of the pair of restraint members 30 and 30 described above disposed on a lower side in the Z-axis direction is longer, in the X-axis direction, than a restraint member 131B disposed on an upper side in the Z-axis direction, as illustrated in FIG. 21. More specifically, the restraint member 131A extends to project from the electrode laminate 10 in the X-axis direction as compared with the restraint member 131B. The second unit 200A according to the seventh modification is different from the second unit 200 according to the embodiment and the modifications described above in that the second unit 200A does not include the pair of base parts 51. That is, in the second unit 200, the flow channel part 60 including the main body pipe 61, the nozzle 62, the first connection part 63, the elastic part 67, and the connection member 70 is attached to the restraint member 131A of the first unit 100 via the attachment part 68.

The attachment part 68 is attached to the restraint member 131A to be freely attached or detached. For example, the attachment part 68 is attached to the restraint member 131A by inserting the insertion members 69 and 69 into the insertion holes 68*a* and 68*a* formed on the attachment part 68 and insertion holes (not illustrated) formed on the restraint member 131A. At this point, the flow channel part 60 is liquid-tightly connected to the opening 20*b* of the electrode laminate 10. The attachment part 68 is removed from the restraint member 131A by extracting the insertion members 69 and 69 from the insertion holes 68*a* and 68*a* and the insertion holes formed on the restraint member 131A.

Figure 22:
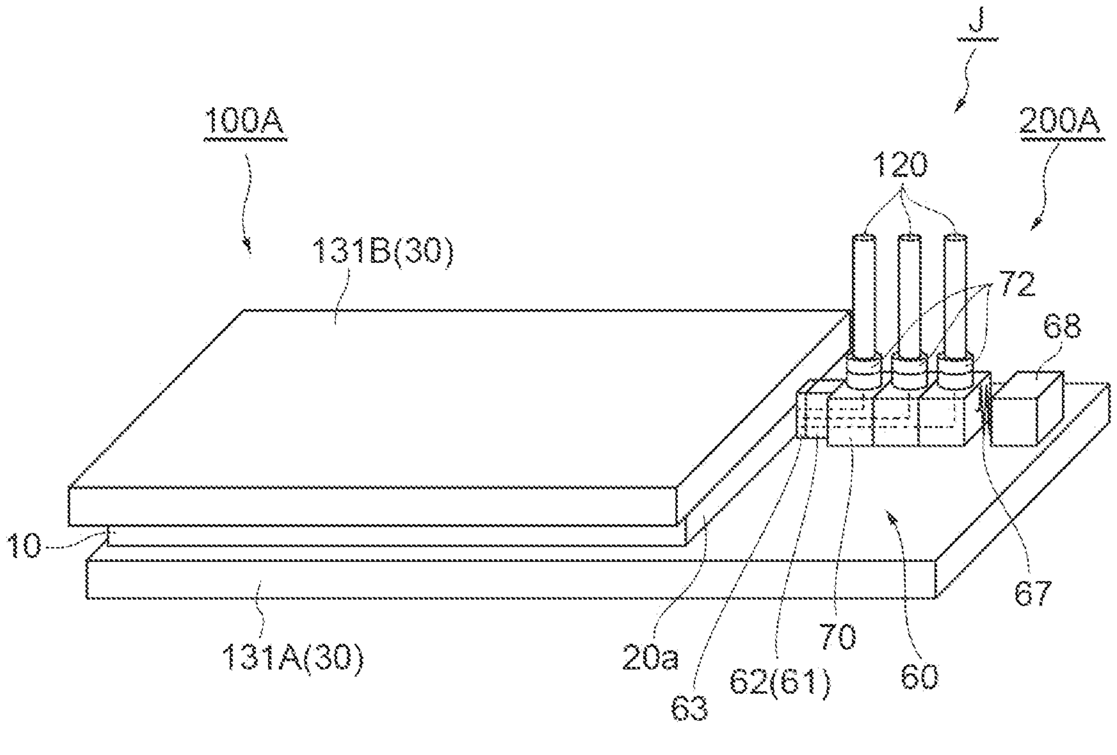
FIG. 22 is a perspective view illustrating a first unit and a second unit similar to the seventh modification.

Basically, the configuration is similar to the configuration of the first unit 100A and the second unit 200A according to the seventh modification, but as illustrated in FIG. 22, the connection member 70 may be disposed to be closer to the electrode laminate 10 side than the attachment part 68 in the X-axis direction. In this case, the elastic part 67 biases the main body pipe 61, the nozzle 62, the first connection part 63, and the connection member 70 in the X-axis direction.

Figure 23:
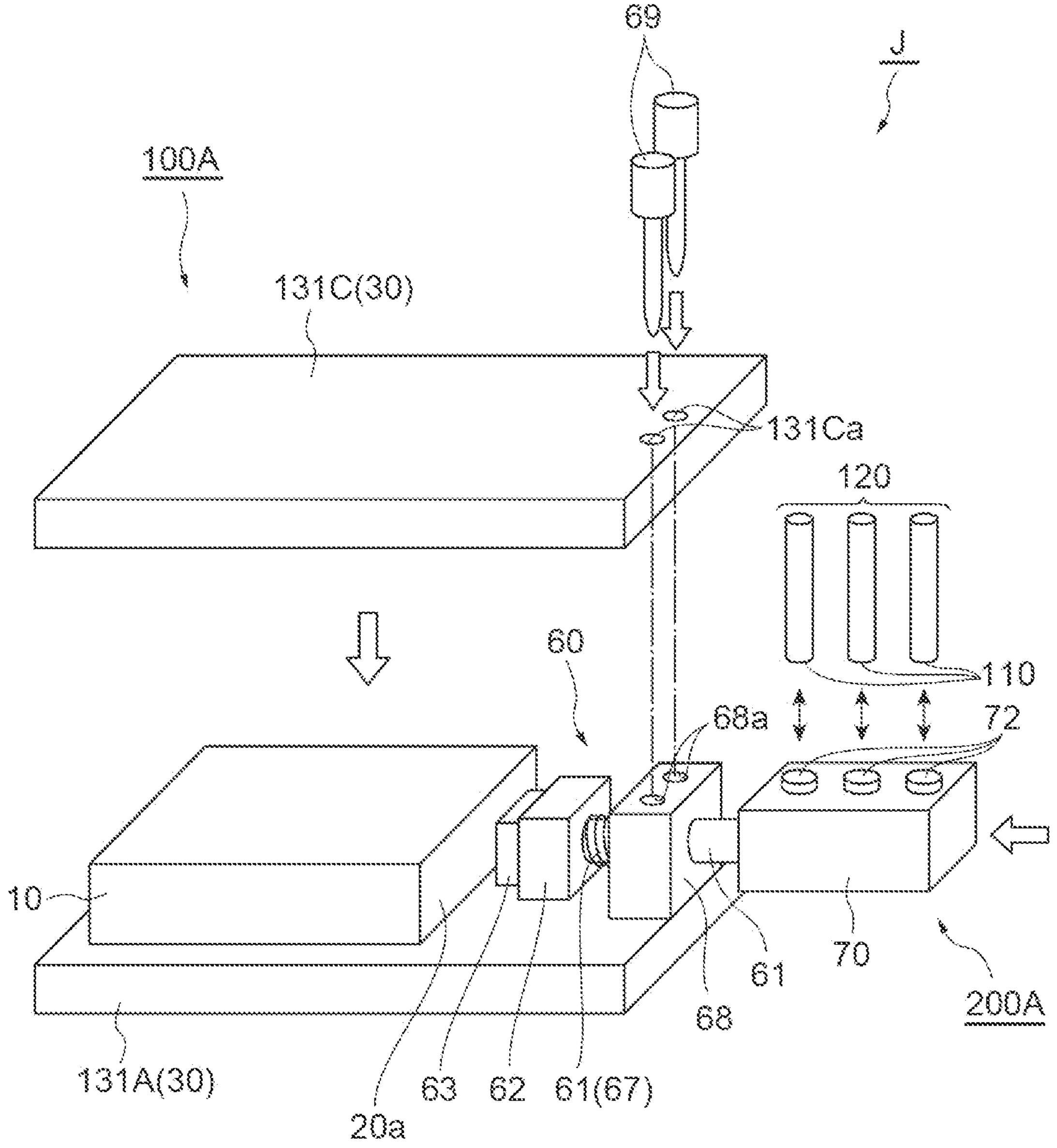
FIG. 23 is a perspective view illustrating a first unit and a second unit similar to the seventh modification.

Basically, the configuration is similar to the configuration of the first unit 100A and the second unit 200A according to the seventh modification, but as illustrated in FIG. 23, a restraint member 131C disposed on an upper side in the Z-axis direction and the restraint member 131A disposed on a lower side in the Z-axis direction may have the same size in the X-axis direction. For example, the attachment part 68 is attached to the restraint member 131C and the restraint member 131A by inserting the insertion members 69 and 69 into the insertion holes 131Ca and 131Ca formed on the restraint member 131C, the insertion holes 68*a* and 68*a* formed on the attachment part 68, and the insertion holes (not illustrated) formed on the restraint member 131A. At this point, the flow channel part 60 is liquid-tightly connected to the opening 20*b* of the electrode laminate 10. The attachment part 68 is removed from the restraint member 131A by extracting the insertion members 69 and 69 from the insertion holes 131Ca and 131Ca, the insertion holes 68*a* and 68*a*, and the insertion holes formed on the restraint member 131A.

The regulation members 40 and 40 configured to restrain the pair of restraint members 30 and 30 are not illustrated in FIG. 21 to FIG. 23, but the regulation members 40 and 40 similarly hold the electrode laminate 10 in the compressed state to regulate extension of the electrode laminate 10.

OTHER MODIFICATIONS

In the embodiment and some of the modifications described above, the electrode laminate 10 is restrained by holding the pair of restraint members 30 and 30 by the regulation members 40 and 40, but the embodiment is not limited thereto. For example, a plurality of bolts may be inserted into the pair of restraint members 30 and 30 to fasten nuts to the respective bolts without using the regulation members 40 and 40, and the electrode laminate 10 may be restrained by fastening force thereof.

Figure 24:
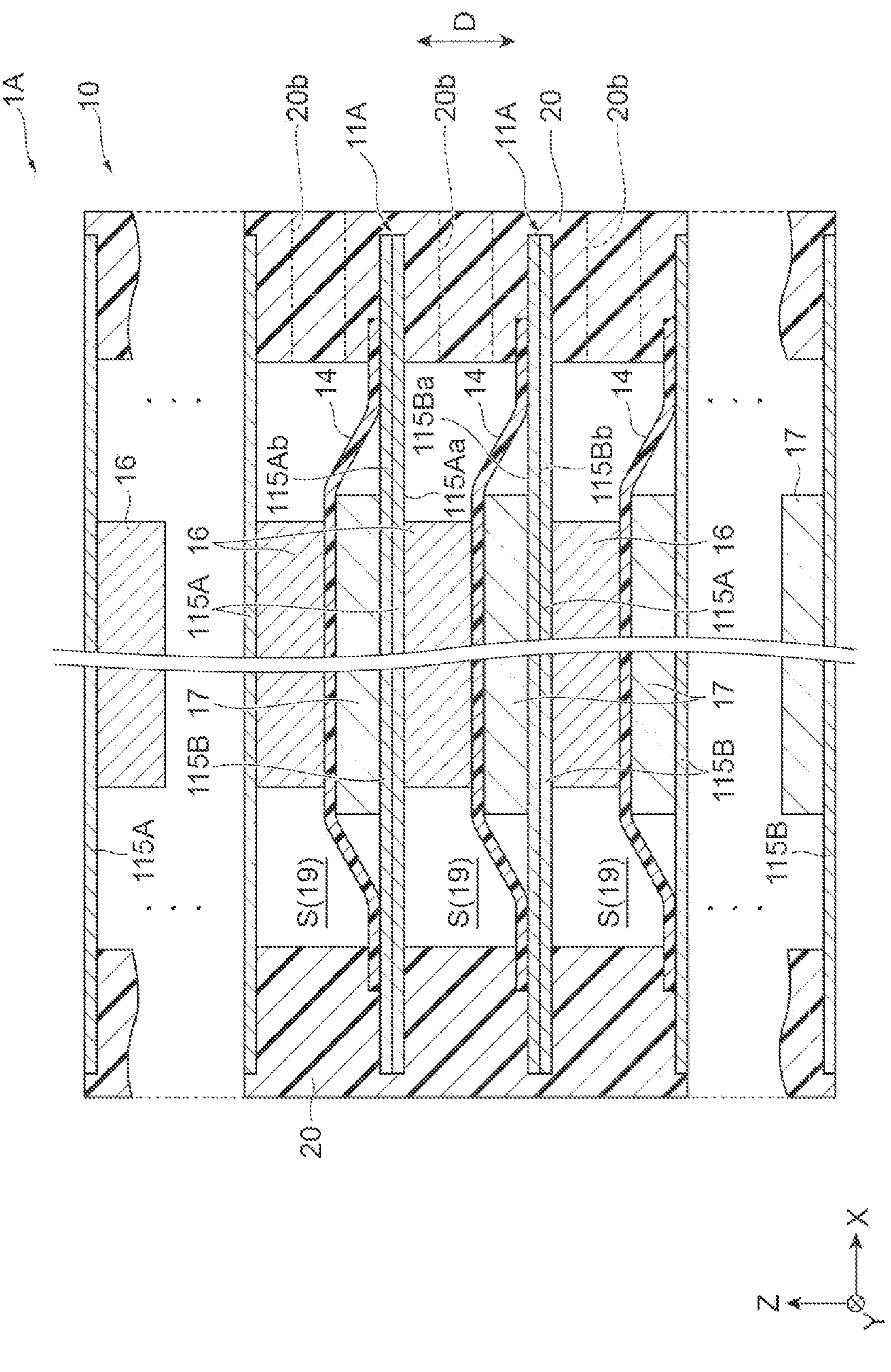
FIG. 24 is a schematic cross-sectional view illustrating a power storage module according to a modification.

In the embodiment and modifications described above, as illustrated in FIG. 1, exemplified is the power storage module 1 having a configuration in which the bipolar electrodes 11 are laminated via the separators 14, the bipolar electrode 11 in which the first surface 15*a* of the current collector 15 is coated with the cathode active material layer 16 and the second surface 15*b* of the current collector 15 is coated with the anode active material layer 17, but the embodiment is not limited thereto. For example, as illustrated in FIG. 24, a power storage module 1A may have a configuration in which pseudo bipolar electrodes 11A are laminated via the separators 14, the bipolar electrode 11A in which a second surface 15Ab of a current collector 115A having a first surface 15Aa coated with the cathode active material layer 16 is brought into contact with a second surface 115Bb of a current collector 115B having a second surface 115Ba coated with the anode active material layer 17 to cause the current collector 115A and the current collector 115B being in contact with each other to be one current collector.

REFERENCE SIGNS LIST

1, 1A . . . POWER STORAGE MODULE
10 . . . ELECTRODE LAMINATE (LAMINATE)
11, 11A . . . BIPOLAR ELECTRODE (ELECTRODE)
12 . . . ANODE TERMINAL ELECTRODE (ELECTRODE)
13 . . . CATHODE TERMINAL ELECTRODE (ELECTRODE)
14 . . . SEPARATOR
15, 115A, 115B . . . CURRENT COLLECTOR
19 . . . ELECTROLYTIC SOLUTION
20 . . . SEALING PART
20*a* . . . SIDE SURFACE
20*b* . . . OPENING
20*c* . . . FRAME PART
20*d* . . . FRAME PART COUPLING BODY
25 . . . SEALING SHEET
30 . . . RESTRAINT MEMBER (CONVEYANCE PALETTE)
40 . . . REGULATION MEMBER
51 . . . BASE PART
60 . . . FLOW CHANNEL PART
61 . . . MAIN BODY PIPE
62 . . . NOZZLE
63 . . . FIRST CONNECTION PART
70 . . . CONNECTION MEMBER
72 . . . SECOND CONNECTION PART
100, 100A . . . FIRST UNIT
110 . . . CONNECTED PART
120 . . . SUPPLY PIPE
200, 200A . . . SECOND UNIT (FLOW CHANNEL UNIT)
D . . . LAMINATING DIRECTION
HB . . . HELD BODY
J . . . RESTRAINT JIG
S . . . SPACE

The invention claimed is:

1. A method for manufacturing a power storage module that includes a laminate configured to include a plurality of electrodes laminated in a first direction, a sealing part sealing a space between the electrodes adjacent to each other, and an opening formed on the sealing part to connect an inside and an outside of the space and opening in a second direction intersecting with the first direction; and that includes an electrolytic solution accommodated in the space, the method comprising:

a placing step of placing the laminate on a conveyance palette so that the first direction runs along a vertical direction;

a connecting step of preparing a flow channel unit including a first connection part capable of being liquid-tightly connected to the opening, a second connection part capable of being connected to a connected part, and a flow channel causing the first connection part to communicate with the second connection part, the connecting step connecting the first connection part of the flow channel unit to the opening of the laminate placed at the placing step so that a connecting portion of the second connection part with respect to the connected part is positioned above the opening in the vertical direction;

a supplying step of connecting the connected part of a supply pipe for the electrolytic solution to the second connection part of the flow channel unit after the connecting step, and supplying the electrolytic solution to the space via the flow channel unit; and a conveying step of removing the connected part of the supply pipe from the second connection part after the supplying step, and conveying the laminate placed on the conveyance palette to a place where a next step is performed so that the first direction runs along the vertical direction in a state in which the opening is connected to the first connection part.

2. The method for manufacturing the power storage module according to claim 1, wherein the first connection part is connected to the opening in a state of being biased with respect to the laminate.

3. The method for manufacturing the power storage module according to claim 1, the method further comprising:

a restraining step of attaching, to the laminate, a restraint member configured to restrain the laminate in the first direction with a predetermined pressure before the supplying step.

4. The method for manufacturing the power storage module according to claim 3, wherein, the restraint member is attached to the laminate so that one side surface of the restraint member is flush with a side surface of the laminate on which the opening is formed at the conveying step.

5. The method for manufacturing the power storage module according to claim 3, wherein the flow channel unit and the restraint member are configured to be able to be attached or detached to/from each other, and the first connection part is connected to the opening of the laminate by attaching the flow channel unit to the restraint member at the connecting step.

6. The method for manufacturing the power storage module according to claim 1, wherein the second connection part is closed when the connected part is removed from the second connection part at the conveying step.

7. The method for manufacturing the power storage module according to claim 1, the method further comprising:

an activating step as the next step of accommodating the laminate in a charging and discharging device to activate the laminate at the place to where the laminate is conveyed at the conveying step, the flow channel unit being connected to the laminate, wherein gas generated in the space due to the activation at the activating step is discharged via the second connection part.

8. The method for manufacturing the power storage module according to claim 7, wherein the connected part of a gas bag is connected to the second connection part at the activating step.

9. The method for manufacturing the power storage module according to claim 7, the method further comprising:

a sealing step of changing a posture of the laminate after the activating step so that the opening of the laminate is oriented in a vertically upward direction, then removing the flow channel unit from the opening, and sealing the opening.

10. The method for manufacturing the power storage module according to claim 4, wherein the flow channel unit and the restraint member are configured to be able to be attached or detached to/from each other, and the first connection part is connected to the opening of the laminate by attaching the flow channel unit to the restraint member at the connecting step.

11. The method for manufacturing the power storage module according to claim 2, wherein the second connection part is closed when the connected part is removed from the second connection part at the conveying step.

12. The method for manufacturing the power storage module according to claim 3, wherein the second connection part is closed when the connected part is removed from the second connection part at the conveying step.

13. The method for manufacturing the power storage module according to claim 4, wherein the second connection part is closed when the connected part is removed from the second connection part at the conveying step.

14. The method for manufacturing the power storage module according to claim 5, wherein the second connection part is closed when the connected part is removed from the second connection part at the conveying step.

15. The method for manufacturing the power storage module according to claim 10, wherein the second connection part is closed when the connected part is removed from the second connection part at the conveying step.

* * * * *